(12) United States Patent
Meng et al.

(10) Patent No.: US 12,603,340 B2
(45) Date of Patent: Apr. 14, 2026

(54) ENERGY STORAGE SYSTEM

(71) Applicant: Huawei Digital Power Technologies Co., Ltd., Shenzhen (CN)

(72) Inventors: Hao Meng, Dongguan (CN); Burak Viktar, Minsk (BY); Jun Chen, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 842 days.

(21) Appl. No.: 17/972,707

(22) Filed: Oct. 25, 2022

(65) Prior Publication Data

US 2023/0135372 A1 May 4, 2023

(30) Foreign Application Priority Data

Oct. 28, 2021 (CN) .......................... 202111261931.3

(51) Int. Cl.
| | |
|---|---|
| *H01M 10/613* | (2014.01) |
| *H01M 10/615* | (2014.01) |
| *H01M 10/63* | (2014.01) |
| *H01M 10/6554* | (2014.01) |
| *H01M 10/6556* | (2014.01) |
| *H01M 10/6564* | (2014.01) |

(52) U.S. Cl.
CPC ....... *H01M 10/613* (2015.04); *H01M 10/615* (2015.04); *H01M 10/63* (2015.04); *H01M 10/6554* (2015.04); *H01M 10/6556* (2015.04); *H01M 10/6564* (2015.04)

(58) Field of Classification Search
CPC .. H01M 10/613; H01M 10/617; H01M 10/63; H01M 10/633; H01M 10/6554
See application file for complete search history.

(56) References Cited

U.S. PATENT DOCUMENTS

2011/0206967 A1* 8/2011 Itsuki ................ H01M 10/6556
429/120

FOREIGN PATENT DOCUMENTS

| CN | 107878223 A | 4/2018 |
|---|---|---|
| CN | 207883871 U | 9/2018 |
| CN | 109768351 A | 5/2019 |
| CN | 110071344 A | 7/2019 |

(Continued)

OTHER PUBLICATIONS

CN14566732 English translation. Jin et al. China. May 31, 2022 (Year: 2022).*

*Primary Examiner* — Christopher P Domone
(74) *Attorney, Agent, or Firm* — Maier & Maier, PLLC

(57) ABSTRACT

An energy storage system includes at least one battery pack and a thermal management system. The battery pack includes a cooling plate and a battery cell. The cooling plate comes in contact with the battery cell to transfer heat energy. The thermal management system includes a control unit, a compressor, a heat exchanger, and at least one first control valve. The control unit is configured to: when a battery cell temperature of the battery pack is greater than or equal to a first temperature threshold, control the compressor to compress a thermal management medium, so that a thermal management medium flows into the heat exchanger; and control opening of the first control valve to control the thermal management medium to flow into the cooling plate in the battery pack to exchange heat with the battery cell, to decrease the battery cell temperature.

27 Claims, 14 Drawing Sheets

(56)      References Cited

FOREIGN PATENT DOCUMENTS

| | | | |
|---|---|---|---|
| CN | 110112501 | A | 8/2019 |
| CN | 110224197 | A | 9/2019 |
| CN | 110581330 | A | 12/2019 |
| CN | 110600831 | A | 12/2019 |
| CN | 110854470 | A | 2/2020 |
| CN | 111251805 | A | 6/2020 |
| CN | 111251811 | A | 6/2020 |
| CN | 111251815 | A | 6/2020 |
| CN | 111251816 | A | 6/2020 |
| CN | 211653087 | U | 10/2020 |
| CN | 112290113 | A | 1/2021 |
| CN | 112549902 | A | 3/2021 |
| CN | 213920592 | U | 8/2021 |
| CN | 14566732 | * | 5/2022 |

* cited by examiner

ENERGY STORAGE SYSTEM

CROSS-REFERENCE TO RELATED APPLICATION

This application claims priority to Chinese Patent Application No. 202111261931.3, filed on Oct. 28, 2021, which is hereby incorporated by reference in its entirety.

TECHNICAL FIELD

The embodiments relate to the field of power electronics technologies, and an energy storage system.

BACKGROUND

In the field of power electronics technologies, to protect an electricity element in an energy storage system and improve a service life of a battery in the energy storage system, a thermal management component needs to be used to decrease an operating temperature of the battery in the energy storage system. In a common energy storage system, cooling is usually performed by using an air cooling apparatus or a water cooling apparatus. In a research and practice process, it has been found that, in the conventional technology, an air cooling apparatus cools an energy storage system through air circulation, and usually requires large air supply space (namely, an air duct). As a result, the energy storage system that uses the air cooling apparatus for cooling has an excessively large volume, and cooling efficiency of the air cooling apparatus is low because air cannot directly come in contact with battery cells in batteries. In addition, because air supply distances from an air intake vent in the air cooling apparatus to the batteries (or battery packs) in the energy storage system are different, a temperature difference between the batteries in the energy storage system is large. However, compared with the air cooling apparatus, a water cooling apparatus usually has high layout costs although the water cooling apparatus has better cooling effect. In addition, because a medium used for cooling in a pipe is usually conductive liquid, the energy storage system has low safety and poor applicability.

SUMMARY

The embodiments may provide an energy storage system. A temperature of a thermal management medium may be controlled, and the thermal management medium flows through a cooling plate to exchange heat with a battery cell. A structure is simple, thermal management costs are low, thermal management efficiency is high, system safety is high, and applicability is high.

According to a first aspect, the embodiments may provide an energy storage system. The energy storage system includes at least one battery pack and a thermal management system. The battery pack includes a cooling plate and a battery cell. The cooling plate comes in contact with the battery cell to transfer heat energy. The thermal management system includes a control unit, a compressor, a heat exchanger, and at least one first control valve. The cooling plate herein may be a pipe with good thermal conductivity, or a channel through which any thermal management medium can flow. When a thermal management medium flows through the cooling plate, the thermal management medium in the cooling plate may exchange heat with the battery cell. For example, a thermal management medium with a lower temperature may absorb heat energy of a battery cell with a higher temperature. Further, a battery cell temperature may be decreased. An outlet of the compressor may be connected to the heat exchanger, the heat exchanger may be connected to a first inlet and outlet of the cooling plate in the battery pack through the first control valve, and a second inlet and outlet of the cooling plate in the battery pack may be connected to an inlet of the compressor. Herein, the control unit may obtain a battery cell temperature of the battery pack. When the battery cell temperature of the battery pack is greater than or equal to a first temperature threshold, the control unit may be configured to control the compressor to compress a thermal management medium, so that a thermal management medium flows into the heat exchanger, and control opening of the first control valve to control the thermal management medium to flow into the cooling plate in the battery pack to exchange heat with the battery cell, to decrease the battery cell temperature. The first temperature threshold herein may be set by the control unit based on an empirical value, may be a rated highest safe temperature of the battery cell, or may be a highest temperature at which the battery cell can operate normally, where the highest temperature is calculated based on a current operating status of the energy storage system. The thermal management medium herein may be a refrigerant, a cooling working medium, or any flowable medium that is convenient to absorb or release heat energy. The thermal management medium may be gas, liquid, or a gas-liquid mixture, which may be determined based on an actual application scenario. This is not limited herein. The compressor herein may compress a gaseous thermal management medium, to improve pressure of the thermal management medium, and provide power for the thermal management medium to flow in the thermal management system. Herein, the control unit may control the opening of the first control valve, to control a flow rate (or a flow) at which the thermal management medium flows into the cooling plate in the battery pack. Further, heat of the battery cell is absorbed by the thermal management medium flowing through the cooling plate, to decrease the battery cell temperature (for example, decrease the battery cell temperature to a safe operating temperature range). It may be understood that, when a temperature of the thermal management medium flowing through the cooling plate is excessively high or the battery cell temperature is excessively low, heat of the battery cell that can be absorbed by the thermal management medium is limited. The control unit may increase the opening of the first control valve, to increase the flow rate (or the flow) at which the thermal management medium flows into the cooling plate in the battery pack and improve a cooling capability of the system for the battery cell.

When the battery cell temperature of the battery pack is greater than or equal to a first temperature threshold, the control unit may control the compressor to operate and control the opening of the first control valve, so that the thermal management medium flows through the cooling plate to exchange heat with the battery cell, to decrease the battery cell temperature. A structure is simple, thermal management costs are low, thermal management efficiency is high, system safety is high, and applicability is high.

With reference to the first aspect, in a first possible implementation, the thermal management system further includes a first heating apparatus, and the second inlet and outlet of the cooling plate in the battery pack is connected to the inlet of the compressor by using the first heating apparatus. The first heating apparatus herein may be configured to heat a thermal management medium flowing out of the battery pack to an overheated state, to decrease humidity of a thermal management medium flowing into the compressor. The first heating apparatus may heat the thermal management medium flowing out of the battery pack to a gas state, to decrease a percentage of a liquid thermal management medium in the thermal management medium flowing into the compressor. In this way, a liquid impact phenomenon (excessive liquid substances may impact the compressor after entering the compressor, and deformation or rupture of the compressor is caused) is avoided because the liquid thermal management medium is prevented from flowing into the compressor, and the compressor is ensured to operate safely. A structure is simple, safety is high, and applicability is high.

With reference to the first possible implementation of the first aspect, in a second possible implementation, the first heating apparatus is a superheater. The superheater herein may be configured to heat, by using heat energy of the thermal management medium flowing into the battery pack, the thermal management medium flowing out of the battery pack to the overheated state, to decrease the humidity of the thermal management medium flowing into the compressor. In other words, if a temperature of the thermal management medium flowing out of the battery pack is T1, the superheater may heat, by using heat energy of a thermal management medium whose temperature is higher than T1 (for example, the thermal management medium flowing into the battery pack), the thermal management medium flowing out of the battery pack to the gas state. Therefore, the thermal management system can ensure that the temperature of the thermal management medium flowing into the battery pack is low enough to absorb the heat of the battery cell in a process in which the thermal management medium flows through the cooling plate, to decrease the battery cell temperature (for example, decrease the battery cell temperature to the safe operating temperature range). In addition, the liquid thermal management medium is prevented from flowing into the compressor to cause the liquid impact phenomenon (the excessive liquid substances may impact the compressor after entering the compressor, and deformation or rupture of the compressor is caused). On the basis of ensuring that the compressor operates safely, heat energy circulation in the thermal management system is further regulated. A structure is simple, thermal management efficiency is high, safety is high, and energy utilization is high.

With reference to the second possible implementation of the first aspect, in a third possible implementation, one end of the superheater is connected to the first control valve and the first inlet and outlet of the cooling plate in the battery pack, and the other end of the superheater is connected to the second inlet and outlet of the cooling plate in the battery pack and the inlet of the compressor. The superheater herein may be configured to heat, by using heat energy of a thermal management medium flowing out of the first control valve, the thermal management medium flowing out of the battery pack to the overheated state, to decrease the humidity of the thermal management medium flowing into the compressor. In other words, if the temperature of the thermal management medium flowing out of the battery pack is T1, the superheater may heat, by using the heat energy of the thermal management medium whose temperature is higher than T1 (for example, the thermal management medium flowing out of the first control valve), the thermal management medium flowing out of the battery pack to the gas state. Therefore, the thermal management system can ensure that the temperature of the thermal management medium flowing into the battery pack is low enough to absorb the heat of the battery cell in the process in which the thermal management medium flows through the cooling plate, to decrease the battery cell temperature (for example, decrease the battery cell temperature to the safe operating temperature range). In addition, the liquid thermal management medium is prevented from flowing into the compressor to cause the liquid impact phenomenon (the excessive liquid substances may impact the compressor after entering the compressor, and deformation or rupture of the compressor is caused). On the basis of ensuring that the compressor operates safely, heat of the thermal management medium flowing out of the first control valve is used to further regulate heat energy circulation in the thermal management system. A structure is simple, thermal management efficiency is high, and energy utilization is high.

With reference to the second possible implementation of the first aspect, in a fourth possible implementation, one end of the superheater is connected to the heat exchanger and the first control valve, and the other end of the superheater is connected to the second inlet and outlet of the cooling plate in the battery pack and the inlet of the compressor. The superheater herein may be configured to heat, by using heat energy of a thermal management medium flowing out of the heat exchanger, the thermal management medium flowing out of the battery pack to the overheated state, to decrease the humidity of the thermal management medium flowing into the compressor. In other words, if the temperature of the thermal management medium flowing out of the battery pack is T1, the superheater may heat, by using the heat energy of the thermal management medium whose temperature is higher than T1 (for example, the thermal management medium flowing out of the heat exchanger), the thermal management medium flowing out of the battery pack to the gas state. Therefore, the thermal management system can ensure that the temperature of the thermal management medium flowing into the battery pack is low enough to absorb the heat of the battery cell in the process in which the thermal management medium flows through the cooling plate, to decrease the battery cell temperature (for example, decrease the battery cell temperature to the safe operating temperature range). In addition, the liquid thermal management medium is prevented from flowing into the compressor to cause the liquid impact phenomenon (the excessive liquid substances may impact the compressor after entering the compressor, and deformation or rupture of the compressor is caused). On the basis of ensuring that the compressor operates safely, heat of the thermal management medium flowing out of the heat exchanger is used to further regulate heat energy circulation in the thermal management system. A structure is simple, thermal management efficiency is high, safety is high, and energy utilization is high.

With reference to the second possible implementation of the first aspect, in a fifth possible implementation, one end of the superheater is connected to the outlet of the compressor and the heat exchanger, and the other end of the superheater is connected to the second inlet and outlet of the cooling plate in the battery pack and the inlet of the compressor. The superheater herein may be configured to heat, by using heat energy of a thermal management medium flowing out of the outlet of the compressor, the thermal management medium flowing out of the battery pack to the overheated state, to decrease the humidity of the thermal management medium flowing into the compressor. In other words, if the temperature of the thermal management medium flowing out of the battery pack is T1, the superheater may heat, by using the heat energy of the thermal management medium whose temperature is higher than T1 (for example, the thermal management medium flowing out of the outlet of the compressor), the thermal management medium flowing out of the battery pack to the gas state. Therefore, the thermal management system can ensure that the temperature of the thermal management medium flowing into the battery pack is low enough to absorb the heat of the battery cell in the process in which the thermal management medium flows through the cooling plate, to decrease the battery cell temperature (for example, decrease the battery cell temperature to the safe operating temperature range). In addition, the liquid thermal management medium is prevented from flowing into the compressor to cause the liquid impact phenomenon (the excessive liquid substances may impact the compressor after entering the compressor, and deformation or rupture of the compressor is caused). On the basis of ensuring that the compressor operates safely, heat of the thermal management medium flowing out of the outlet of the compressor is used to further regulate heat energy circulation in the thermal management system. A structure is simple, thermal management efficiency is high, safety is high, and energy utilization is high.

With reference to the first aspect or any one of the first to the fifth possible implementations of the first aspect, in a sixth possible implementation, the thermal management system further includes a gas-liquid separator, and the second inlet and outlet of the cooling plate in the battery pack is connected to the inlet of the compressor by using the first heating apparatus and the gas-liquid separator. The gas-liquid separator herein may be configured to separate gas and liquid in a thermal management medium obtained through heating by the first heating apparatus (leave a liquid thermal management medium inside the gas-liquid separator, and transfer a gas thermal management medium to the compressor), to decrease humidity of the thermal management medium flowing into the compressor. This further ensures that the compressor operates safely. A structure is simple, safety is high, and applicability is high.

With reference to the first aspect or any one of the first to the sixth possible implementations of the first aspect, in a seventh possible implementation, the thermal management system further includes a second control valve. Herein, the second control valve may be connected between the second inlet and outlet of the cooling plate in the battery pack and the first heating apparatus. Herein, the second control valve may be configured to control a flow of a thermal management medium input to the first heating apparatus from the second inlet and outlet of the cooling plate in the battery pack. It may be understood that the first heating apparatus herein may be a heating apparatus (for example, a heater) that can generate heat energy by itself and may alternatively be a heat transfer apparatus (for example, a superheater) that can perform heating by using heat energy of a thermal management medium in another position. It may be further understood that the thermal management system may adjust opening of the second control valve based on heating performance of the first heating apparatus (in other words, whether the first heating apparatus is sufficient to heat the thermal management medium output by the battery pack to the overheated state). Further, a flow of the thermal management medium input to the first heating apparatus from the second inlet and outlet of the cooling plate in the battery pack is controlled, to ensure that the first heating apparatus can heat the thermal management medium output by the battery pack to the overheated state, to decrease the humidity of the thermal management medium flowing into the compressor. This further ensures that the compressor operates safely. A structure is simple, safety is high, energy utilization is high, and applicability is high.

With reference to the first aspect or any one of the first to the seventh possible implementations of the first aspect, in an eighth possible implementation, the energy storage system includes a plurality of battery packs, and the thermal management system includes a plurality of first control valves and a plurality of first heating apparatuses (for example, a plurality of dispersedly-distributed superheaters). Herein, a first inlet and outlet of a cooling plate in one battery pack is connected to one first control valve or connected to one first control valve by using one first heating apparatus, and a second inlet and outlet of the cooling plate in the one battery pack is connected to the inlet of the compressor by using the one first heating apparatus. Herein, thermal management media flowing through the battery packs may be aggregated after flowing out of the first heating apparatuses (namely, the superheaters) corresponding to the battery packs, and then a thermal management medium obtained through aggregation flows into the compressor. The control unit may be further configured to: when a battery cell temperature of any one battery pack is greater than or equal to the first temperature threshold, control opening of a first control valve connected to the any one battery pack to control the thermal management medium to flow into a cooling plate in the any one battery pack to exchange heat with a battery cell in the any one battery pack, to decrease the battery cell temperature of the any one battery pack. Herein, the control unit may obtain battery cell temperatures of the battery packs. When a battery cell temperature of any battery pack (for example, a target battery pack) is greater than or equal to the first temperature threshold, the control unit may control opening of a first control valve connected to the battery pack to control the thermal management medium to flow into a cooling plate in the battery pack to exchange heat with a battery cell, to decrease the battery cell temperature. The first temperature threshold herein may be set by the control unit based on the empirical value, may be the rated highest safe temperature of the battery cell, or may be the highest temperature at which the battery cell can operate normally, where the highest temperature is calculated based on the current operating status of the energy storage system. It may be understood that first temperature thresholds corresponding to the battery packs herein may be the same or may be different. It may be further understood that the control unit may separately control, based on the battery cell temperatures of the battery packs and the first temperature thresholds corresponding to the battery packs, opening of the first control valves connected to the battery packs. Herein, the control unit may obtain a temperature and/or pressure of a thermal management medium at the outlet of the compressor, and control, based on the temperature and/or the pressure of the thermal management medium at the outlet of the compressor and a battery cell temperature of the target battery pack, opening of a first control valve connected to the target battery pack. In this way, a flow rate (or a flow) at which the thermal management medium flows into a cooling plate in the target battery pack is controlled, so that heat of the battery cell can be absorbed by the thermal management medium flowing through the cooling plate, and the battery cell temperature of the target battery pack is decreased (for example, the battery cell temperature is decreased to the safe operating temperature range). A structure is simple, thermal management costs are low, thermal management efficiency is high, system safety is high, and applicability is high.

With reference to the first aspect or any one of the first to the seventh possible implementations of the first aspect, in a ninth possible implementation, the energy storage system includes a plurality of battery packs, and the thermal management system includes a plurality of first control valves and one first heating apparatus (for example, an integrated superheater). Herein, a first inlet and outlet of a cooling plate in one battery pack is connected to one first control valve or connected to one first control valve by using the first heating apparatus, and a second inlet and outlet of the cooling plate in the one battery pack is connected to the inlet of the compressor by using the first heating apparatus. Herein, thermal management media flowing through the battery packs may separately flow into the first heating apparatus (namely, the superheater), and an integrated thermal management medium obtained through aggregation in the first heating apparatus flows into the compressor. The control unit may be further configured to: when a battery cell temperature of any one battery pack is greater than or equal to the first temperature threshold, control opening of a first control valve connected to the any one battery pack to control the thermal management medium to flow into a cooling plate in the any one battery pack to exchange heat with a battery cell in the any one battery pack, to decrease the battery cell temperature of the any one battery pack. Herein, the control unit may obtain battery cell temperatures of the battery packs. When a battery cell temperature of any battery pack (for example, a target battery pack) is greater than or equal to the first temperature threshold, the control unit may control opening of a first control valve connected to the battery pack to control the thermal management medium to flow into a cooling plate in the battery pack to exchange heat with a battery cell, to decrease the battery cell temperature. The first temperature threshold herein may be set by the control unit based on the empirical value, may be the rated highest safe temperature of the battery cell, or may be the highest temperature at which the battery cell can operate normally, where the highest temperature is calculated based on the current operating status of the energy storage system. It may be understood that first temperature thresholds corresponding to the battery packs herein may be the same or may be different. It may be further understood that the control unit may separately control, based on the battery cell temperatures of the battery packs and the first temperature thresholds corresponding to the battery packs, opening of the first control valve connected to the battery packs. Herein, the control unit may obtain a temperature and/or pressure of a thermal management medium at the outlet of the compressor, and control, based on the temperature and/or the pressure of the thermal management medium at the outlet of the compressor and a battery cell temperature of the target battery pack, opening of a first control valve connected to the target battery pack. In this way, a flow rate (or a flow) at which the thermal management medium flows into a cooling plate in the target battery pack is controlled, so that heat of the battery cell can be absorbed by the thermal management medium flowing through the cooling plate, and the battery cell temperature of the target battery pack is decreased (for example, the battery cell temperature is decreased to the safe operating temperature range). A structure is simple, thermal management costs are low, thermal management efficiency is high, system safety is high, and applicability is high.

With reference to the eighth or the ninth possible implementation of the first aspect, in a tenth possible implementation, the thermal management system further includes a lumped control valve. One end of the lumped control valve is connected to the heat exchanger, and the other end of the lumped control valve is connected to the battery packs through the first control valves corresponding to the battery packs. The lumped control valve may be an expansion valve (or another valve having a flow control function), and the first control valve may be an expansion valve or a solenoid valve (or another valve having a flow control function or an on/off function). Alternatively, the lumped control valve may be a check valve (or another valve having a flow control function or an on/off function), and the first control valve may be an expansion valve (or another valve having a flow control function). That is, the thermal management system may use a combination of valves with different functions as the lumped control valve and the first control valve, to control a flow (or a flow rate) of the thermal management medium flowing through each battery pack. A structure is simple, a control operation is simple, costs are low, and applicability is high.

With reference to the first aspect or any one of the first to the tenth possible implementations of the first aspect, in an eleventh possible implementation, the thermal management system further includes a four-way valve. Herein, one end of the heat exchanger is connected to first inlets and outlets of cooling plates in the battery packs through the first control valves, the other end of the heat exchanger is connected to a first end of the four-way valve, a second end of the four-way valve is connected to second inlets and outlets of the cooling plates in the battery packs, a third end of the four-way valve is connected to the outlet of the compressor, and a fourth end of the four-way valve is connected to the inlet of the compressor or connected to the inlet of the compressor by using the gas-liquid separator. Herein, the control unit may be further configured to: when the battery cell temperature of the battery pack is greater than or equal to the first temperature threshold, control the four-way valve to connect the outlet of the compressor and the heat exchanger and connect the second inlet and outlet of the cooling plate in the battery pack and the inlet of the compressor, to control the thermal management medium to flow into the cooling plate in the battery pack to exchange heat with the battery cell, to decrease the battery cell temperature. In other words, the control unit may change a connection manner of the four ends of the four-way valve, to change a connection manner in the thermal management system. When the battery cell temperature needs to be decreased, the control unit may control the four-way valve, so that the thermal management medium output by the compressor may flow in from the first inlet and outlet of the cooling plate in the battery pack by using the heat exchanger and the first control valve, and flow out from the second inlet and outlet of the cooling plate in the battery pack, to decrease the battery cell temperature. A structure is simple, a control operation is simple, costs are low, and applicability is high.

With reference to the eleventh possible implementation of the first aspect, in a twelfth possible implementation, when the battery cell temperature of the battery pack is less than or equal to a second temperature threshold, the control unit may be further configured to: control the four-way valve to connect the outlet of the compressor and the second inlet and outlet of the cooling plate in the battery pack and connect the heat exchanger and the outlet of the compressor, and control the compressor to heat the thermal management medium to control the thermal management medium to flow into the cooling plate in the battery pack to exchange heat with the battery cell, to increase the battery cell temperature. The second temperature threshold is less than the first temperature threshold. The second temperature threshold herein may be set by the control unit based on an empirical value, may be a rated lowest safe temperature of the battery cell, or may be a lowest temperature at which the battery cell can operate normally, where the lowest temperature is calculated based on the current operating status of the energy storage system. The thermal management medium herein may be a refrigerant, a cooling working medium, or any flowable medium that is convenient to absorb or release heat energy. The thermal management medium may be gas, liquid, or a gas-liquid mixture, which may be determined based on an actual application scenario. This is not limited herein. The compressor herein may compress and heat a gaseous thermal management medium, to improve pressure and a temperature of the thermal management medium and provide power for the thermal management medium to flow in the thermal management system. Herein, the control unit may control the four-way valve to change the connection manner of the four ends, so that the thermal management medium flowing out of the compressor flows through the cooling plate in the battery pack to release heat to the battery cell, and the battery cell temperature is increased (for example, the battery cell temperature is increased to the normal operating temperature range). A structure is simple, thermal management costs are low, thermal management efficiency is high, system safety is high, and applicability is high.

With reference to the twelfth possible implementation of the first aspect, in a thirteenth possible implementation, the thermal management system further includes a regenerator. Herein, the regenerator may be disposed adjacent to the heat exchanger, and the regenerator may be connected between the second end of the four-way valve and the second inlets and outlets of the cooling plates in the battery packs. The regenerator herein may be configured to heat a thermal management medium in the heat exchanger by using the heat energy of the thermal management medium flowing into the battery pack, to decrease the humidity of the thermal management medium flowing into the compressor. After the thermal management medium flows through the cooling plate in the battery pack to exchange heat energy with the battery cell, a part of the thermal management medium may change to a liquid state because heat energy is decreased. The regenerator may use the heat energy of the thermal management medium flowing out of the compressor (or the thermal management medium flowing into the compressor) to heat the thermal management medium in the heat exchanger, to decrease a percentage of a liquid thermal management medium in the thermal management medium flowing into the compressor. In this way, the liquid thermal management medium is prevented from flowing into the compressor to cause the liquid impact phenomenon (the excessive liquid substances may impact the compressor after entering the compressor, and deformation or rupture of the compressor is caused), and the compressor is ensured to operate safely. A structure is simple, safety is high, and applicability is high.

With reference to the twelfth or thirteenth possible implementation of the first aspect, in a fourteenth possible implementation, when a temperature of an external environment (or an external environment of the thermal management system) is greater than an external environment temperature threshold, the control unit may control the heat exchanger to start and exchange heat with the thermal management medium output by the first control valve by using air of the external environment, to increase a temperature of the thermal management medium. The external environment temperature threshold herein may be set by the control unit based on an empirical value or may be set based on a current temperature of the thermal management medium in the heat exchanger (for example, the external environment temperature threshold may be a temperature greater than the current temperature of the thermal management medium in the heat exchanger). In other words, the heat exchanger may use the air of the external environment to heat the thermal management medium output by the first control valve, to decrease the percentage of the liquid thermal management medium in the thermal management medium flowing into the compressor. On the basis of ensuring that the compressor operates safely, heat energy in the external environment is used. A structure is simple, energy utilization is improved, and system operation costs are decreased.

With reference to any one of the twelfth to fourteenth possible implementations of the first aspect, in a fifteenth possible implementation, when the first heating apparatus is the superheater (or a heat transfer apparatus that performs heating by using heat energy of a thermal management medium in another position), the thermal management system further includes a second heating apparatus. Herein, the second heating apparatus may be connected between the second end of the four-way valve and the second inlets and outlets of the cooling plates in the battery packs. The second heating apparatus may be configured to heat a thermal management medium output by the regenerator. A thermal management medium obtained through heating flows into the cooling plate in the battery pack to exchange heat with the battery cell, to increase the battery cell temperature. It may be understood that, when the temperature of the thermal management medium flowing out of the compressor is low or the temperature of the thermal management medium flowing through the cooling plate in the battery pack is low in another case, and the temperature is insufficient to meet a requirement for heating the battery cell, the control unit may control another heating apparatus (for example, the first heating apparatus or the second heating apparatus) to heat the thermal management medium to increase the temperature of the thermal management medium, to meet the requirement for heating the battery cell. It may be further understood that, if the first heating apparatus is the heater (or another heating apparatus that can generate heat energy by itself), the thermal management system may combine the second heating apparatus with the first heating apparatus or cancel deployment of the second heating apparatus. The thermal management system may use the first heating apparatus to heat the thermal management medium output by the regenerator, and the thermal management medium obtained through heating flows into the cooling plate in the battery pack to exchange heat with the battery cell, to increase the battery cell temperature. The control unit may control the first heating apparatus and/or the second heating apparatus to heat the thermal management medium input to the cooling plate in the battery pack, to ensure that the thermal management medium flowing through the cooling plate in the battery pack has sufficient heat energy to increase the battery cell temperature. A structure is simple, safety is high, flexibility is high, and applicability is high.

With reference to any one of the twelfth to fifteenth possible implementations of the first aspect, in a sixteenth possible implementation, the lumped control valve may be a bidirectional expansion valve (or another valve having a bidirectional flow control function), and the thermal management system may further include at least one first check valve. Herein, one end of one first check valve may be connected to the lumped control valve, and the other end of the one first check valve may be connected to a first inlet and outlet of the cooling plate in one battery pack. Herein, the first check valve may be configured to prevent the thermal management medium from flowing back from the lumped control valve to the battery pack connected to the first check valve. It may be understood that, when the first control valve is a bidirectional expansion valve (or another valve having a bidirectional flow control function), the lumped control valve may not be disposed in the thermal management system, and the thermal management system may control the flow (or the flow rate) of the thermal management medium input to the heat exchanger by controlling the opening of the first control valve. That is, when a percentage of a liquid thermal management medium in the thermal management medium flowing into the heat exchanger is high due to a low temperature, the control unit may use different valve combinations and control corresponding valves to decrease the flow (or the flow rate) of the thermal management medium flowing through the heat exchanger, so that the thermal management medium in the heat exchanger can absorb sufficient heat energy by using the regenerator or the external environment. In this way, the liquid thermal management medium is prevented from flowing into the compressor and causing the liquid impact phenomenon (the excessive liquid substances may impact the compressor after entering the compressor, and deformation or rupture of the compressor is caused), and the compressor is ensured to operate safely. A structure is simple, an operation is simple, safety is high, and applicability is high.

With reference to the first aspect or any one of the first to the sixteenth possible implementations of the first aspect, in a seventeenth possible implementation, the energy storage system further includes a medium circulation pipe (used to circulate a thermal management medium). The medium circulation pipe includes a pair of pipe mainline ports and at least one pair of pipe branch ports. A first inlet and outlet of a cooling plate in one battery pack may be connected to one first control valve or connected to one first control valve by using one first heating apparatus, and a second inlet and outlet of the cooling plate in the one battery pack may be connected to the inlet of the compressor by using the one first heating apparatus. Herein, the heat exchanger and the compressor in the thermal management system may be integrated into one door-mounted heat dissipation module. The door-mounted heat dissipation module is connected to the pipe mainline ports. The battery packs, the first control valves corresponding to the battery packs, and the first heating apparatuses corresponding to the battery packs may be integrated into at least one battery pack module. The battery pack module is connected to the pipe branch ports. The heat exchanger and the compressor in the energy storage system may be integrated into the door-mounted heat dissipation module, and the door-mounted heat dissipation module may be disposed on a door or at an inlet and outlet of the energy storage system. In addition, the pipe branch ports connected to the battery pack module are connected to the pipe mainline ports, and the pipe mainline ports are connected to the door-mounted heat dissipation module, so that the door-mounted heat dissipation module can be flexibly moved, easy to maintain, and has high applicability.

With reference to the seventeenth possible implementation, in an eighteenth possible implementation, the energy storage system further includes a plurality of medium circulation pipes (used to circulate a thermal management medium). Herein, the heat exchanger, the compressor, the first control valves, and the first heating apparatuses in the thermal management system may be integrated into a top-mounted heat dissipation module. The top-mounted heat dissipation module may be connected to one ends of a plurality of medium circulation pipes, and the battery packs may be connected to other ends of the plurality of medium circulation pipes. The heat exchanger, the compressor, the first control valves, and the first heating apparatuses in the energy storage system may be integrated into the top-mounted heat dissipation module, the top-mounted heat dissipation module may be disposed on the top of the energy storage system, and the top-mounted heat dissipation module and the battery packs are connected through the plurality of medium circulation pipes. This can improve integration of the energy storage system, increase energy density of the energy storage system, and improve thermal management efficiency of the energy storage system.

With reference to the first aspect or any one of the first to the sixteenth possible implementations of the first aspect, in a nineteenth possible implementation, the battery packs in the energy storage system may be integrated into a battery pack module, and the first control valves in the thermal management system are integrated into a module expansion valve. One end of the battery pack module herein may be connected to the heat exchanger through the module expansion valve, the other end of the battery pack module may be connected to the compressor or connected to the compressor by using the gas-liquid separator, and the compressor is connected to the heat exchanger. The heat exchanger herein may be configured to cool a thermal management medium output by the battery pack module. Integration of the energy storage system is improved, energy density of the energy storage system is increased, and thermal management efficiency of the energy storage system is improved.

With reference to the nineteenth possible implementation of the first aspect, in a twentieth possible implementation, the energy storage system further includes a battery management module. Herein, the battery management module may be configured to come in contact with cooling plates in the battery pack module to transfer heat energy, to decrease the humidity of the thermal management medium flowing into the compressor. In other words, the energy storage system may use heat energy generated by the battery management module to heat the thermal management medium flowing into the compressor, to ensure that the compressor operates safely. A structure is simple, energy utilization is high, and costs are low.

With reference to the nineteenth or the twentieth possible implementation of the first aspect, in a twenty-first possible implementation, the heat exchanger is an air cooling apparatus (herein, the air cooling apparatus may include a condenser and a fan), and the energy storage system further includes an air intake vent and an air exhaust vent. The heat exchanger can be configured to cool, through the air intake vent and air exhaust vent, the thermal management medium output by the battery pack module. A structure is simple, and applicability is high.

With reference to the twenty-first possible implementation of the first aspect, in a twenty-second possible implementation, the heat exchanger may be further configured to cool the battery management module through the air intake vent and the air exhaust vent. A structure is simple, and applicability is high.

With reference to the first aspect or any one of the first to the sixteenth possible implementations of the first aspect, in a twenty-third possible implementation, the energy storage system further includes a top air exhaust vent. Herein, thermal management systems and the battery packs in the energy storage system may be integrated into thermal management modules. The thermal management modules in the energy storage system may be stacked to form a plurality of thermal management stacks, and the thermal management stacks are symmetrically distributed with the top air exhaust vent as a center. The energy storage system has high integration, high energy density, and high thermal management efficiency.

With reference to the twenty-third possible implementation of the first aspect, in a twenty-fourth possible implementation, the energy storage system further includes a flow diversion apparatus (for example, a ventilation pipe), and the flow diversion apparatus may be disposed at the top air exhaust vent. Herein, the flow diversion apparatus may be configured to improve a heat dissipation capability of the energy storage system and has a simple structure and high applicability.

With reference to the first aspect or any one of the first to the sixteenth possible implementations of the first aspect, in a twenty-fifth possible implementation, the energy storage system further includes a side air exhaust vent. Herein, thermal management systems and the battery packs in the energy storage system may be integrated into thermal management modules. The thermal management modules in the energy storage system may be stacked to form a plurality of thermal management stacks, and the thermal management stacks are evenly distributed based on the side air exhaust vent. The energy storage system has high integration, high energy density, and high thermal management efficiency.

With reference to the twenty-fifth possible implementation of the first aspect, in a twenty-sixth possible implementation, the energy storage system further includes a flow diversion apparatus (for example, a ventilation pipe), and the flow diversion apparatus may be disposed at the side air exhaust vent. Herein, the flow diversion apparatus may be configured to divert air to flow to the side air exhaust vent, to improve a heat dissipation capability of the energy storage system. The flow diversion apparatus has a simple structure and high applicability.

With reference to the first aspect or any one of the first to the sixteenth possible implementations of the first aspect, in a twenty-seventh possible implementation, the energy storage system may further include at least one direct current-direct current converter, a converter, a transformer, and a grid. The battery pack may be connected to the thermal management system, the thermal management system may be connected to the direct current-direct current converter, and the direct current-direct current converter may be connected to the grid by using the converter and the transformer. Herein, a plurality of battery packs may be integrated into one battery cluster, one DC-DC converter may correspond to one battery cluster for current conversion, and one DC-DC converter may also correspond to a plurality of battery clusters for current conversion. The thermal management system of the energy storage system may enable the thermal management medium to flow through the cooling plate to exchange heat with the battery cell, to increase or decrease the battery cell temperature. A structure is simple and is easy to integrate, thermal management costs are low, system safety is high, and applicability is high.

With reference to the twenty-seventh possible implementation of the first aspect, in a twenty-eighth possible implementation, the energy storage system further includes a power generation apparatus and an inverter. The power generation apparatus is connected to the transformer and the converter by using the inverter. The battery pack may be configured to supply power to the grid or charge the power generation apparatus. The thermal management system of the energy storage system may enable the thermal management medium to flow through the cooling plate to exchange heat with the battery cell, to increase or decrease the battery cell temperature. A structure is simple and is easy to integrate, thermal management costs are low, system safety is high, and applicability is high.

DETAILED DESCRIPTION OF THE EMBODIMENTS

An energy storage system may be applied to a plurality of fields, such as a new energy smart microgrid field, a power transmission and distribution field, a new energy field (for example, a grid-connected photovoltaic power generation field or a grid-connected wind power generation field), a photovoltaic energy storage and power generation field (for example, supplying power to a household device (for example, a refrigerator or an air conditioner) or a grid), a wind energy storage and power generation field, or a high-power converter field (for example, converting a direct current into a high-power high-voltage alternating current). This may be determined depending on an actual application scenario and is not limited herein. The energy storage system may be adapted to different application scenarios, for example, a photovoltaic energy storage and power supply application scenario, a wind energy storage and power supply application scenario, an energy storage application scenario, or another energy storage and power supply application scenario. The following uses the photovoltaic energy storage and power supply application scenario as an example for description, and details are not described below again.

Figure 1:
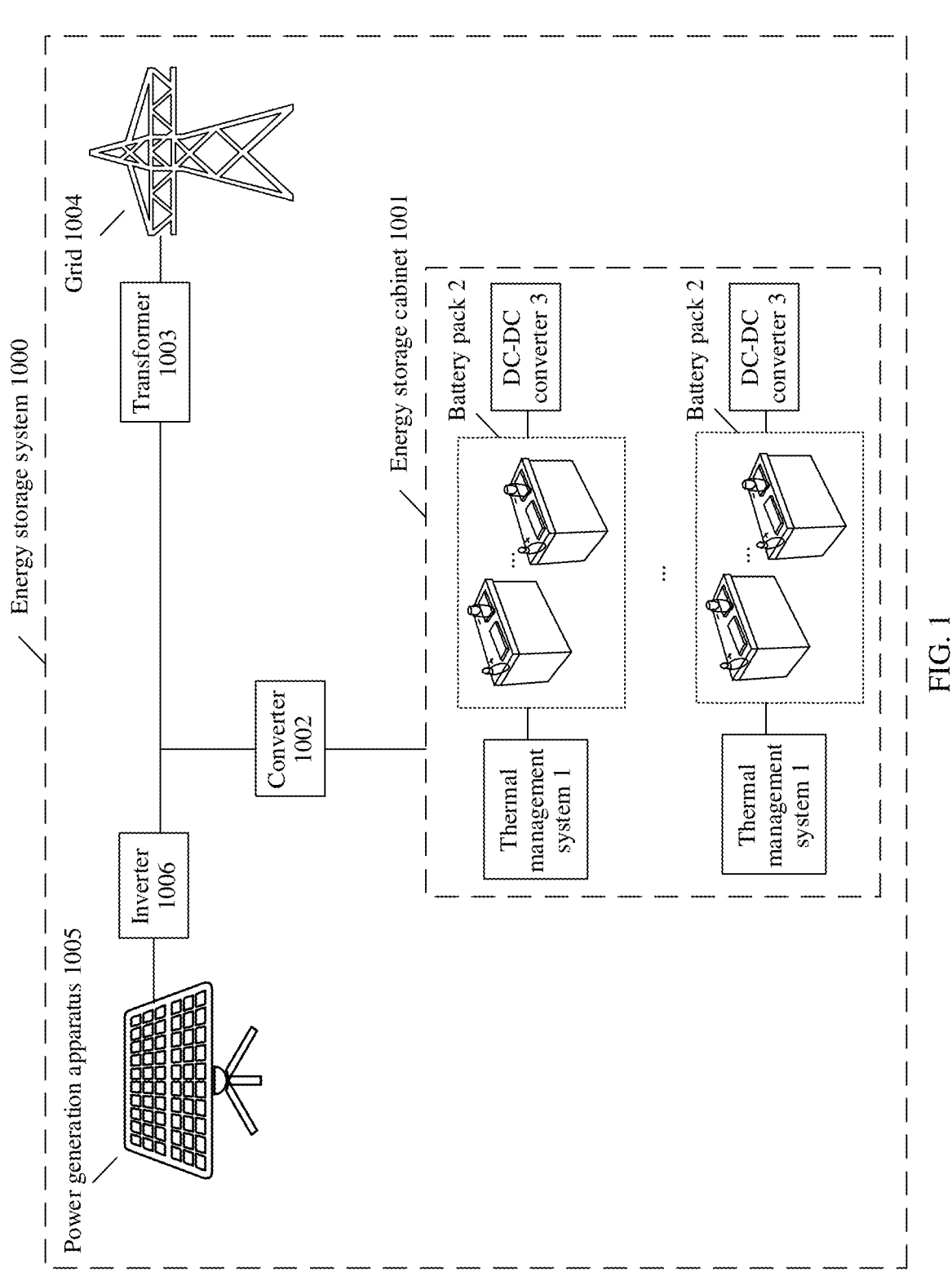
FIG. 1 is a schematic diagram of an application scenario of an energy storage system.

FIG. 1 is a schematic diagram of an application scenario of an energy storage system. In the photovoltaic energy storage and power supply application scenario, as shown in FIG. 1, the energy storage system includes an energy storage cabinet 1001, a converter 1002, a transformer 1003, a grid 1004 (which may also be another power-consuming device), a power generation apparatus 1005 (for example, a photovoltaic power generation apparatus), and an inverter 1006. The power generation apparatus 1005 is connected to the energy storage cabinet 1001 by using the inverter 1006 and the converter 1002, and the energy storage cabinet 1001 is connected to the grid 1004 by using the converter 1002 and the transformer 1003. When power consumption of the grid 1004 is low, the power generation apparatus 1005 may supply energy to the energy storage cabinet 1001 and the grid 1004 at the same time. In this case, the energy storage cabinet 1001 may receive and store, by using the converter 1002 and the inverter 1006, the electric energy transmitted by the power generation apparatus 1005. When the power consumption of the grid 1004 is high, the power generation apparatus 1005 and the energy storage cabinet 1001 may supply energy to the grid 1004 at the same time. In this case, the energy storage cabinet 1001 may transmit energy stored in the energy storage cabinet 1001 to the grid 1004 by using the converter 1002 and the transformer 1003. In some feasible implementations, the energy storage cabinet 1001 may also receive, by using the converter 1002 and the transformer 1003, electric energy transmitted by the grid 1004. It may be understood that, in some energy storage application scenarios (for example, when there is no power generation apparatus 1005 or inverter 1006 in the system), the energy storage cabinet 1001 may also be used as a power supply device to supply power to the grid 1004 by using the converter 1002 and the transformer 1003. It may be further understood that, in some energy storage application scenarios (for example, when there is no power generation apparatus 1005 or inverter 1006 in the system), the energy storage cabinet 1001 may also receive, by using the converter 1002 and the transformer 1003, electric energy transmitted by the grid 1004. In the application scenario shown in FIG. 1, the energy storage cabinet 1001 includes a thermal management system 1, at least one battery pack 2, and at least one DC-DC converter 3. The battery pack 2 may be connected to the thermal management system 1, the thermal management system 1 may be connected to the DC-DC converter 3, and the DC-DC converter 3 may be connected to the grid 1004 by using the converter 1002 and the transformer 1003. Herein, a plurality of battery packs 2 may be integrated into one battery cluster, one DC-DC converter 3 may correspond to one battery cluster for current conversion, and one DC-DC converter 3 may also correspond to a plurality of battery clusters for current conversion. It may be understood that, when a battery cell temperature in the battery pack 2 is excessively high or excessively low, some elements (for example, the battery pack 2) in the energy storage cabinet 1001 has a higher loss and a shorter service life due to the excessively high temperature, or some elements (for example, the battery pack 2) in the energy storage cabinet 1001 cannot provide a sufficient power supply voltage due to the excessively low temperature. In this case, a control unit in the thermal management system 1 may enable a thermal management medium to flow through a cooling plate in the battery pack 2 to exchange heat with a battery cell in the battery pack 2, to increase or decrease the battery cell temperature, and ensure normal energy storage and power supply of the system. A structure is simple and is easy to integrate, thermal management costs are low, system safety is high, and applicability is high.

The following describes, by using examples with reference to FIG. 2 to FIG. 14, a structure and an operating principle of an energy storage system.

Figure 2:
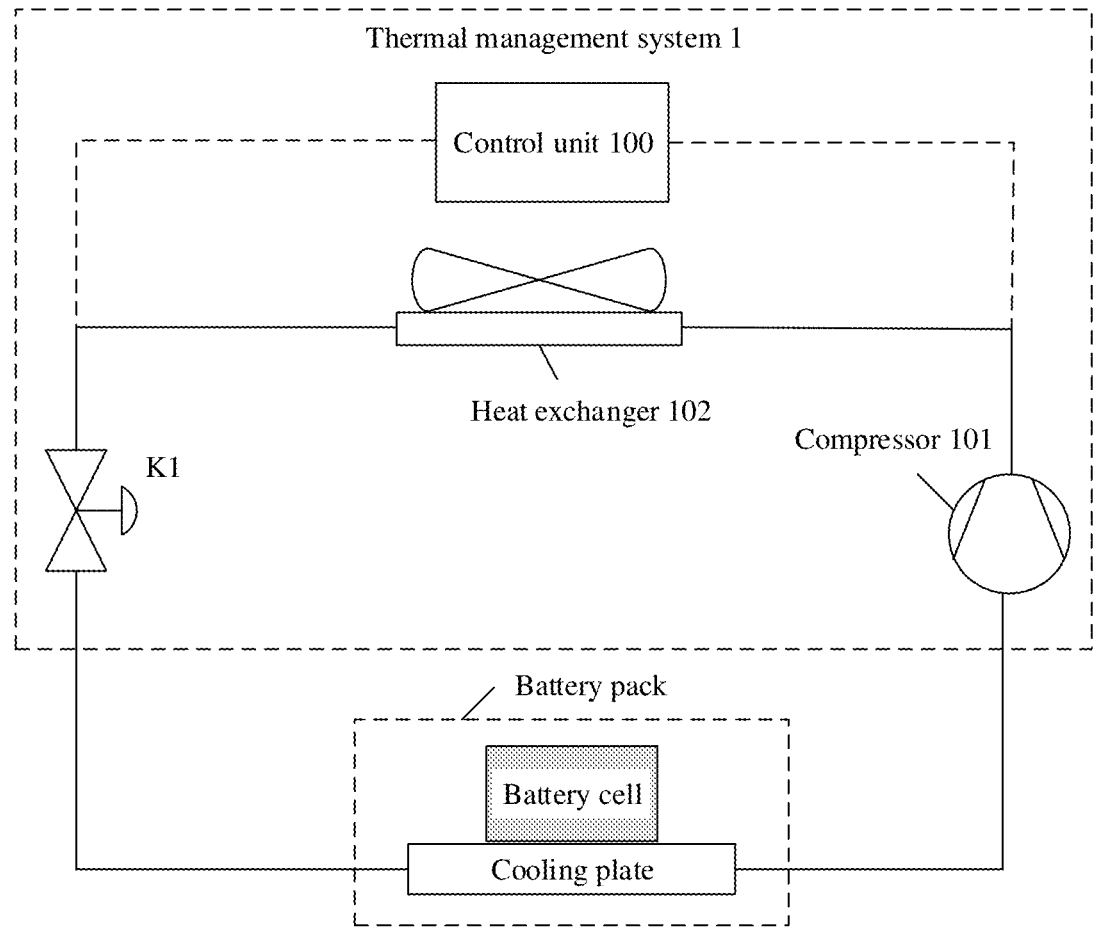
FIG. 2 is a schematic diagram of a structure of an energy storage system.

FIG. 2 is a schematic diagram of a structure of an energy storage system. As shown in FIG. 2, the energy storage system includes at least one battery pack and a thermal management system 1. The battery pack includes a cooling plate and a battery cell. The cooling plate comes in contact with the battery cell to transfer heat energy. The thermal management system 1 includes a control unit 100, a compressor 101, a heat exchanger 102, and at least one first control valve K1. The cooling plate herein may be a pipe with good thermal conductivity, or a channel through which any thermal management medium can flow. When a thermal management medium flows through the cooling plate, the thermal management medium in the cooling plate may exchange heat with the battery cell. For example, a thermal management medium with a lower temperature may absorb heat energy of a battery cell with a higher temperature. Further, a battery cell temperature may be decreased. An outlet of the compressor 101 may be connected to the heat exchanger 102, the heat exchanger 102 may be connected to a first inlet and outlet of the cooling plate in the battery pack through the first control valve K1, and a second inlet and outlet of the cooling plate in the battery pack may be connected to an inlet of the compressor 101. Herein, the control unit 100 may obtain the battery cell temperature of the battery pack. When the battery cell temperature of the battery pack is greater than or equal to a first temperature threshold, the control unit 100 may be configured to control the compressor 101 to compress a thermal management medium, so that a thermal management medium flows into the heat exchanger 102, and control opening of the first control valve K1 (namely, a valve opening degree, a valve adjustment degree, or another parameter that can adjust the opening of the first control valve K1) to control the thermal management medium to flow into the cooling plate in the battery pack to exchange heat with the battery cell, to decrease the battery cell temperature. The first temperature threshold herein may be set by the control unit 100 based on an empirical value, may be a rated highest safe temperature of the battery cell, or may be a highest temperature at which the battery cell can operate normally, where the highest temperature is calculated based on a current operating status of the energy storage system. The thermal management medium herein may be a refrigerant, a cooling working medium, or any flowable medium that is convenient to absorb or release heat energy. The thermal management medium may be gas, liquid, or a gas-liquid mixture, which may be determined based on an actual application scenario. This is not limited herein.

In some feasible implementations, the compressor 101 may compress a gaseous thermal management medium, to improve pressure of the thermal management medium, and provide power for the thermal management medium to flow in the thermal management system 1. Herein, the control unit 100 may obtain a temperature and/or pressure of a thermal management medium at the outlet of the compressor 101 and control the opening of the first control valve K1 based on the temperature and/or the pressure of the thermal management medium at the outlet of the compressor 101 and the battery cell temperature of the battery pack. In this way, a flow rate (or a flow) at which the thermal management medium flows into the cooling plate in the battery pack is controlled, heat of the battery cell can be absorbed by the thermal management medium flowing through the cooling plate, and the battery cell temperature is decreased (for example, the battery cell temperature is decreased to a safe operating temperature range).

It may be understood that, when a temperature of the thermal management medium flowing through the cooling plate is excessively low or the battery cell temperature is excessively low, heat energy transferred by the battery cell to the thermal management medium cannot change the thermal management medium to a gas state. As a result, the humidity of the thermal management medium flowing out of the cooling plate and flowing into the compressor 101 is excessively high. The control unit 100 may decrease the opening of the first control valve K1, to decrease the flow rate (or the flow) at which the thermal management medium flows into the cooling plate in the battery pack. In this way, the thermal management medium flowing into the battery pack fully absorbs the heat of the battery cell, and the humidity of the thermal management medium flowing into the compressor 101 is decreased.

It may be further understood that, when the temperature of the thermal management medium flowing through the cooling plate is excessively high or the battery cell temperature is excessively low, heat of the battery cell that can be absorbed by the thermal management medium is limited. The control unit 100 may increase the opening of the first control valve K1, to increase the flow rate (or the flow) at which the thermal management medium flows into the cooling plate in the battery pack and improve a cooling capability of the system for the battery cell. Herein, the control unit 100 may also control operating parameters (parameters such as power, operating atmospheric pressure, output pressure, and an output temperature) of the compressor 101 based on the temperature and/or the pressure of the thermal management medium at the outlet of the compressor 101; and further adjust the temperature and/or the pressure of the thermal management medium at the outlet of the compressor 101 (for example, higher power of the compressor 101 indicates a higher temperature and higher pressure of the thermal management medium at the outlet of the compressor 101).

In some feasible implementations, the control unit 100 may further control a parameter (for example, a rotational speed) of the heat exchanger 102, to control heat energy exchanged with the outside when the thermal management medium flows through the heat exchanger 102 (for example, when a temperature of an external environment (namely, an environment outside the thermal management system 1) is lower than the temperature of the thermal management medium, a higher rotational speed of the heat exchanger 102 indicates that more heat is dissipated when the thermal management medium flows through the heat exchanger 102, and more temperatures are decreased). It may be understood that, when the temperature of the thermal management medium at the outlet of the compressor 101 is low, the control unit 100 may control the compressor 101 to increase the temperature of the thermal management medium. When the temperature of the thermal management medium at the outlet of the compressor 101 is high, the control unit 100 may control the heat exchanger 102 to decrease the temperature of the thermal management medium.

When the battery cell temperature of the battery pack is greater than or equal to the first temperature threshold, the control unit 100 may control the compressor 101 to operate and control the opening of the first control valve K1, so that the thermal management medium flows through the cooling plate to exchange heat with the battery cell, to decrease the battery cell temperature. A structure is simple, thermal management costs are low, thermal management efficiency is high, system safety is high, and applicability is high.

Figure 3:
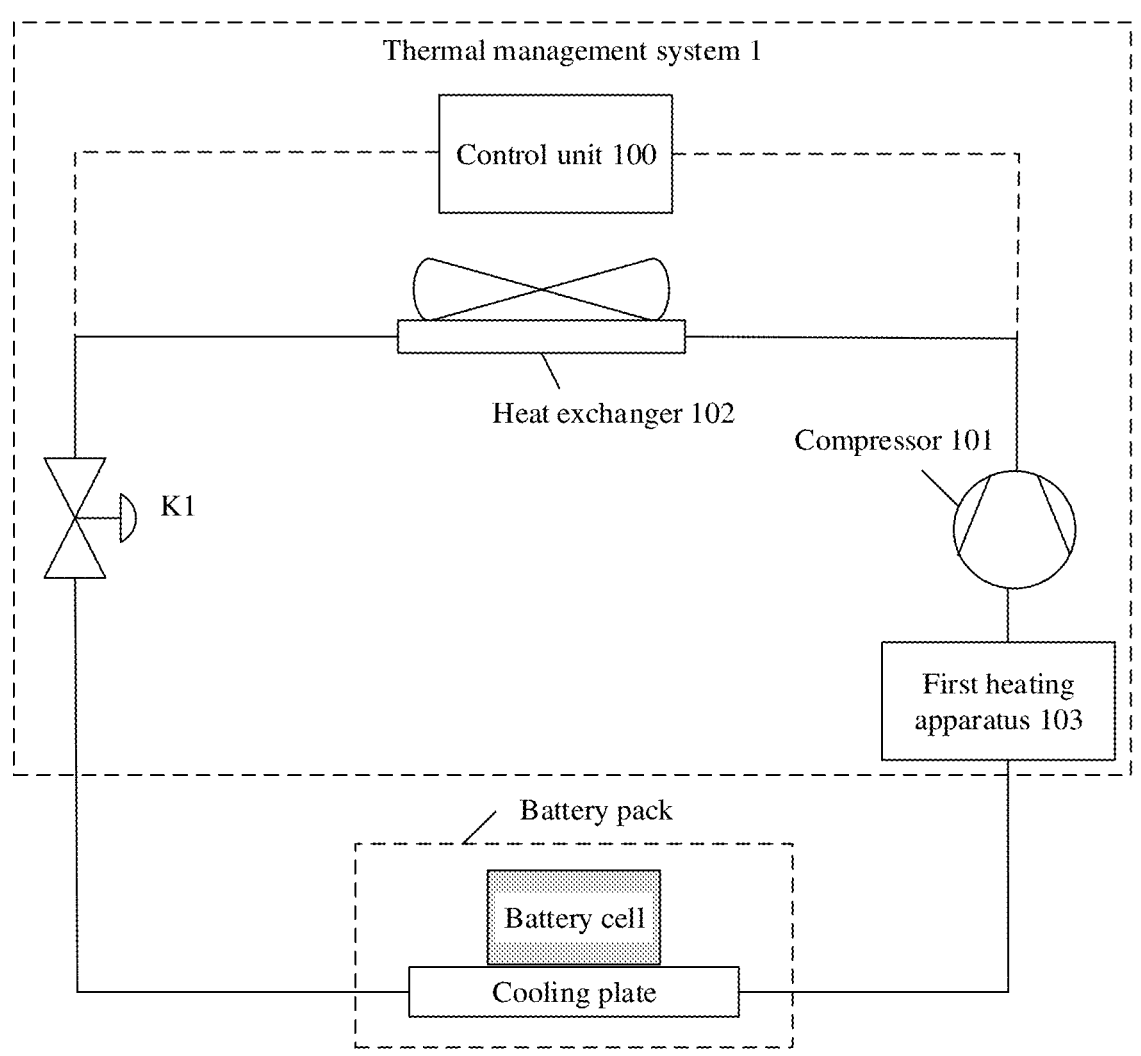
FIG. 3 is a schematic diagram of another structure of an energy storage system.

In some feasible implementations, the thermal management system further includes a first heating apparatus. FIG. 3 is a schematic diagram of another structure of an energy storage system. As shown in FIG. 3, the second inlet and outlet of the cooling plate in the battery pack is connected to the inlet of the compressor 101 by using the first heating apparatus 103. The first heating apparatus 103 herein may be configured to heat the thermal management medium flowing out of the battery pack to an overheated state, to decrease the humidity of the thermal management medium flowing into the compressor 101. The first heating apparatus 103 may heat the thermal management medium flowing out of the battery pack to a gas state, to decrease a percentage of a liquid thermal management medium in the thermal management medium flowing into the compressor 101. In this way, a liquid impact phenomenon (excessive liquid substances may impact the compressor after entering the compressor, and deformation or rupture of the compressor is caused) is avoided because the liquid thermal management medium is prevented from flowing into the compressor 101, and the compressor 101 is ensured to operate safely. A structure is simple, safety is high, and applicability is high.

Figure 4:
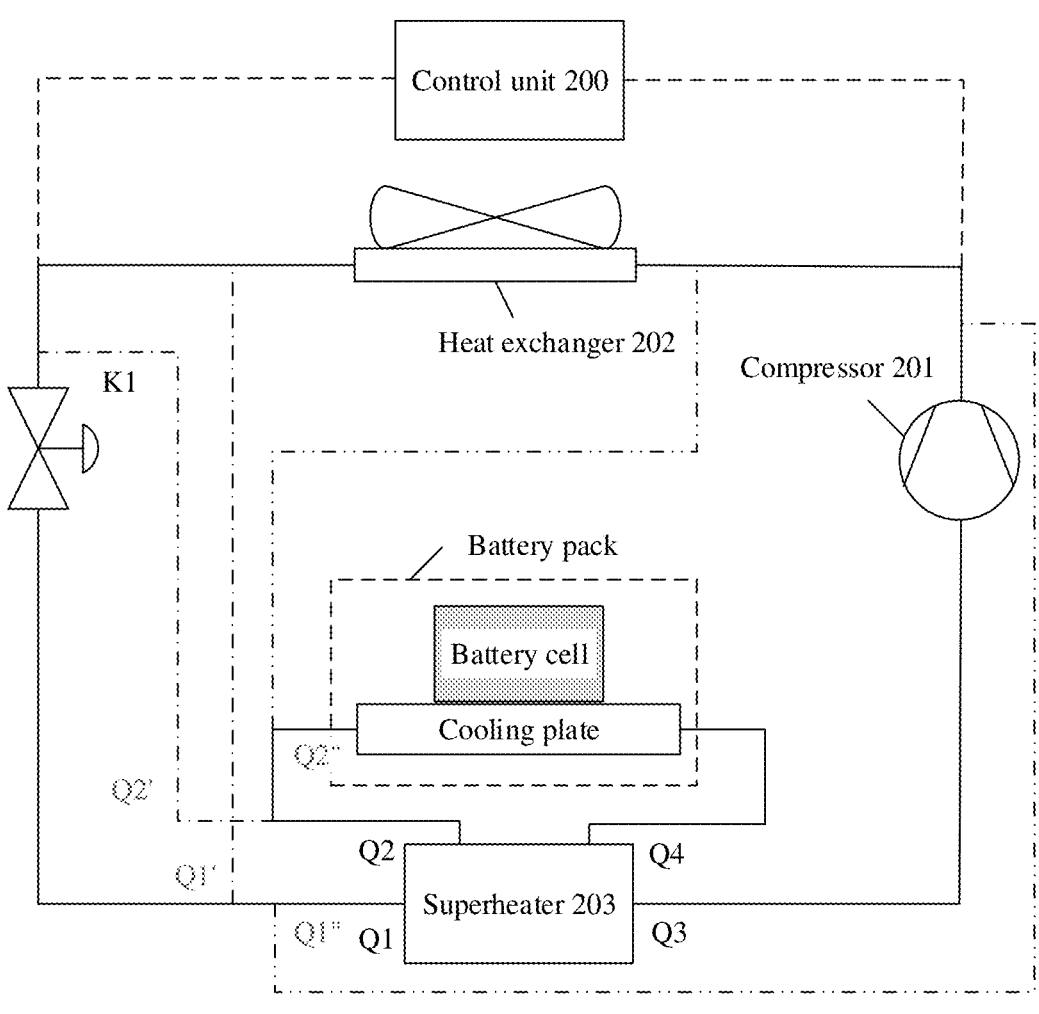
FIG. 4 is a schematic diagram of another structure of an energy storage system.

In some feasible implementations, the first heating apparatus 103 in FIG. 3 may be a superheater (or another apparatus that can transfer heat of a thermal management medium with a higher temperature to a thermal management medium with a lower temperature). FIG. 4 is a schematic diagram of another structure of an energy storage system. As shown in FIG. 4, a Q1 end of the superheater 203 may be connected to the first control valve K1, a Q2 end of the superheater 203 may be connected to the first inlet and outlet of the cooling plate in the battery pack, a Q4 end of the superheater 203 may be connected to the second inlet and outlet of the cooling plate in the battery pack, and a Q3 end of the superheater 203 may be connected to the inlet of the compressor 201. The superheater 203 herein may be configured to heat, by using heat energy of a thermal management medium flowing out of the first control valve K1, the thermal management medium flowing out of the battery pack to the overheated state, to decrease the humidity of the thermal management medium flowing into the compressor 201.

In other words, if a temperature of the thermal management medium flowing out of the battery pack is T1, the superheater 203 may heat, by using heat energy of a thermal management medium whose temperature is higher than T1 (for example, the thermal management medium flowing out of the first control valve K1), the thermal management medium flowing out of the battery pack to a gas state. Therefore, the thermal management system can ensure that the temperature of the thermal management medium flowing into the battery pack is low enough to absorb the heat of the battery cell in a process in which the thermal management medium flows through the cooling plate, to decrease the battery cell temperature (for example, decrease the battery cell temperature to the safe operating temperature range). In addition, the liquid thermal management medium is prevented from flowing into the compressor 201 to cause the liquid impact phenomenon (the excessive liquid substances may impact the compressor after entering the compressor, and deformation or rupture of the compressor is caused). On the basis of ensuring that the compressor 201 operates safely, heat of the thermal management medium flowing out of the first control valve is used to further regulate heat energy circulation in the thermal management system. A structure is simple, thermal management efficiency is high, safety is high, and energy utilization is high.

In some feasible implementations, as shown in FIG. 4, the Q1 end (Q1') of the superheater 203 may be connected to the heat exchanger 202, the Q2 end (Q2') of the superheater 203 may be connected to the first control valve K1, the Q4 end of the superheater 203 may be connected to the second inlet and outlet of the cooling plate in the battery pack, and the Q3 end of the superheater 203 may be connected to the inlet of the compressor 201. The superheater 203 herein may be configured to heat, by using heat energy of a thermal management medium flowing out of the heat exchanger 202, the thermal management medium flowing out of the battery pack to the overheated state, to decrease the humidity of the thermal management medium flowing into the compressor 201. In other words, if the temperature of the thermal management medium flowing out of the battery pack is T1, the superheater 203 may heat, by using the heat energy of the thermal management medium whose temperature is higher than T1 (for example, the thermal management medium flowing out of the heat exchanger 202), the thermal management medium flowing out of the battery pack to the gas state. On the basis of ensuring that the compressor operates safely, heat of the thermal management medium flowing out of the heat exchanger is used to further adjust heat energy circulation in the thermal management system. A structure is simple, thermal management efficiency is high, safety is high, and energy utilization is high.

In some feasible implementations, as shown in FIG. 4, the Q1 end (Q1") of the superheater 203 may be connected to the outlet of the compressor 201, the Q2 end (Q2") of the superheater 203 may be connected to the heat exchanger 202, the Q4 end of the superheater 203 may be connected to the second inlet and outlet of the cooling plate in the battery pack, and the Q3 end of the superheater 203 may be connected to the inlet of the compressor 201. The superheater 203 herein may be configured to heat, by using heat energy of a thermal management medium flowing out of the outlet of the compressor 201, the thermal management medium flowing out of the battery pack to the overheated state, to decrease the humidity of the thermal management medium flowing into the compressor 201. In other words, if the temperature of the thermal management medium flowing out of the battery pack is T1, the superheater 203 may heat, by using the heat energy of the thermal management medium whose temperature is higher than T1 (for example, the thermal management medium flowing out of the outlet of the compressor 201), the thermal management medium flowing out of the battery pack to the gas state. On the basis of ensuring that the compressor operates safely, heat of the thermal management medium flowing out of the outlet of the compressor is used to further adjust heat energy circulation in the thermal management system. A structure is simple, thermal management efficiency is high, safety is high, and energy utilization is high.

It may be understood that the foregoing three connection manners of the superheater 203 are merely examples for describing a connection relationship of the superheater 203. In a specific application scenario, a position and the connection relationship of the superheater 203 may be determined based on an actual layout position of the battery pack and the compressor 201, the heat exchanger 202, or the first control valve K1. Details are not described herein again.

Figure 5:
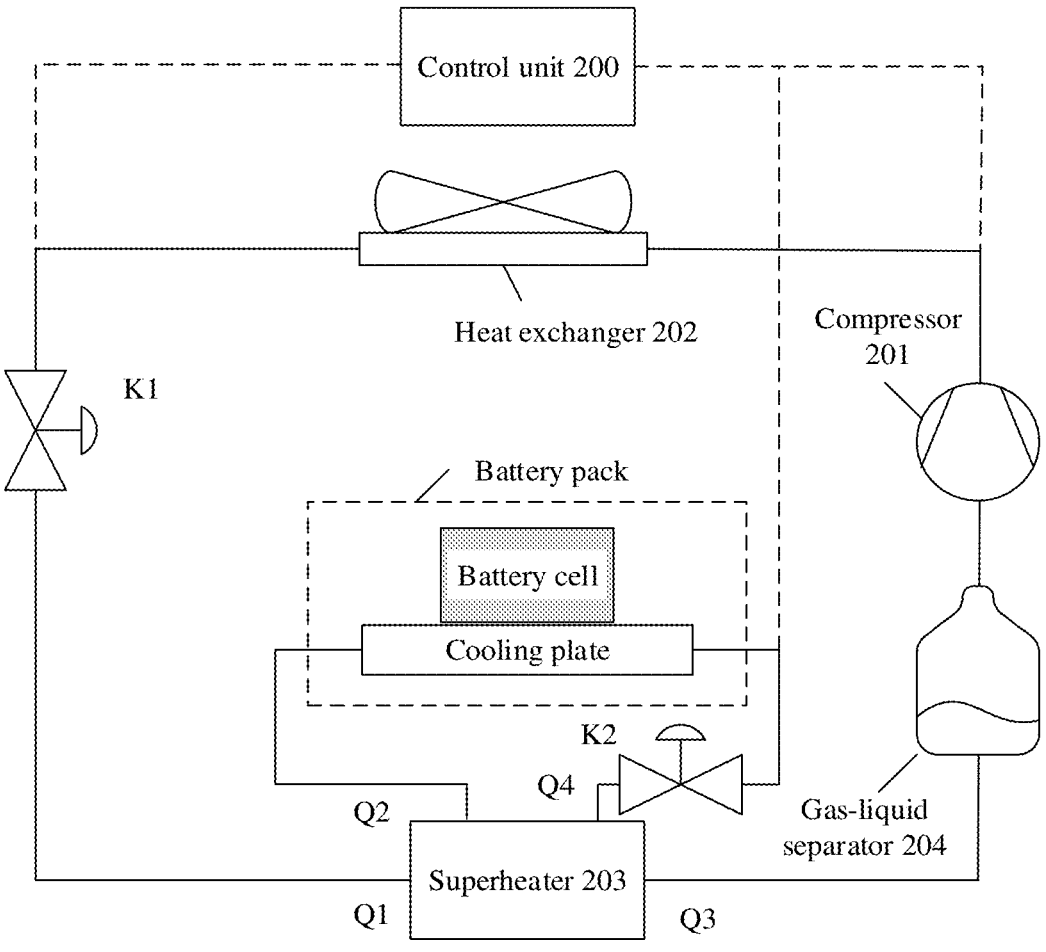
FIG. 5 is a schematic diagram of another structure of an energy storage system.

In some feasible implementations, to further ensure that the compressor operates safely, the thermal management system further includes a gas-liquid separator. FIG. 5 is a schematic diagram of another structure of an energy storage system. As shown in FIG. 5, the second inlet and outlet of the cooling plate in the battery pack may be connected to the inlet of the compressor 201 by using the first heating apparatus (namely, the superheater 203) and the gas-liquid separator 204. The gas-liquid separator 204 herein may be configured to separate gas and liquid in a thermal management medium obtained through heating by the superheater 203 (leave a liquid thermal management medium inside the gas-liquid separator 204, and transfer a gas thermal management medium to the compressor 201), to decrease the humidity of the thermal management medium flowing into the compressor 201. This further ensures that the compressor 201 operates safely. A structure is simple, safety is high, and applicability is high.

In some feasible implementations, to further improve flexibility and a control capability of the system, the thermal management system may further include a second control valve K2. Refer to FIG. 5 again. As shown in FIG. 5, the second control valve K2 may be connected between the second inlet and outlet of the cooling plate in the battery pack and the first heating apparatus (namely, the superheater 203). Herein, the second control valve K2 may be configured to control a flow of a thermal management medium input to the first heating apparatus from the second inlet and outlet of the cooling plate in the battery pack. It may be understood that the first heating apparatus herein may be a heating apparatus (for example, a heater) that can generate heat energy by itself and may alternatively be a heat transfer apparatus (for example, the superheater 203) that can heat by using heat energy of a thermal management medium in another position. It may be further understood that the thermal management system may adjust opening of the second control valve K2 based on heating performance of the first heating apparatus (in other words, whether the first heating apparatus is sufficient to heat the thermal management medium output by the battery pack to the overheated state). Further, the flow of the thermal management medium input to the first heating apparatus from the second inlet and outlet of the cooling plate in the battery pack is controlled, to ensure that the first heating apparatus can heat the thermal management medium output by the battery pack to the overheated state, to decrease the humidity of the thermal management medium flowing into the compressor 201. This further ensures that the compressor 201 operates safely. A structure is simple, safety is high, energy utilization is high, and applicability is high.

Figure 6:
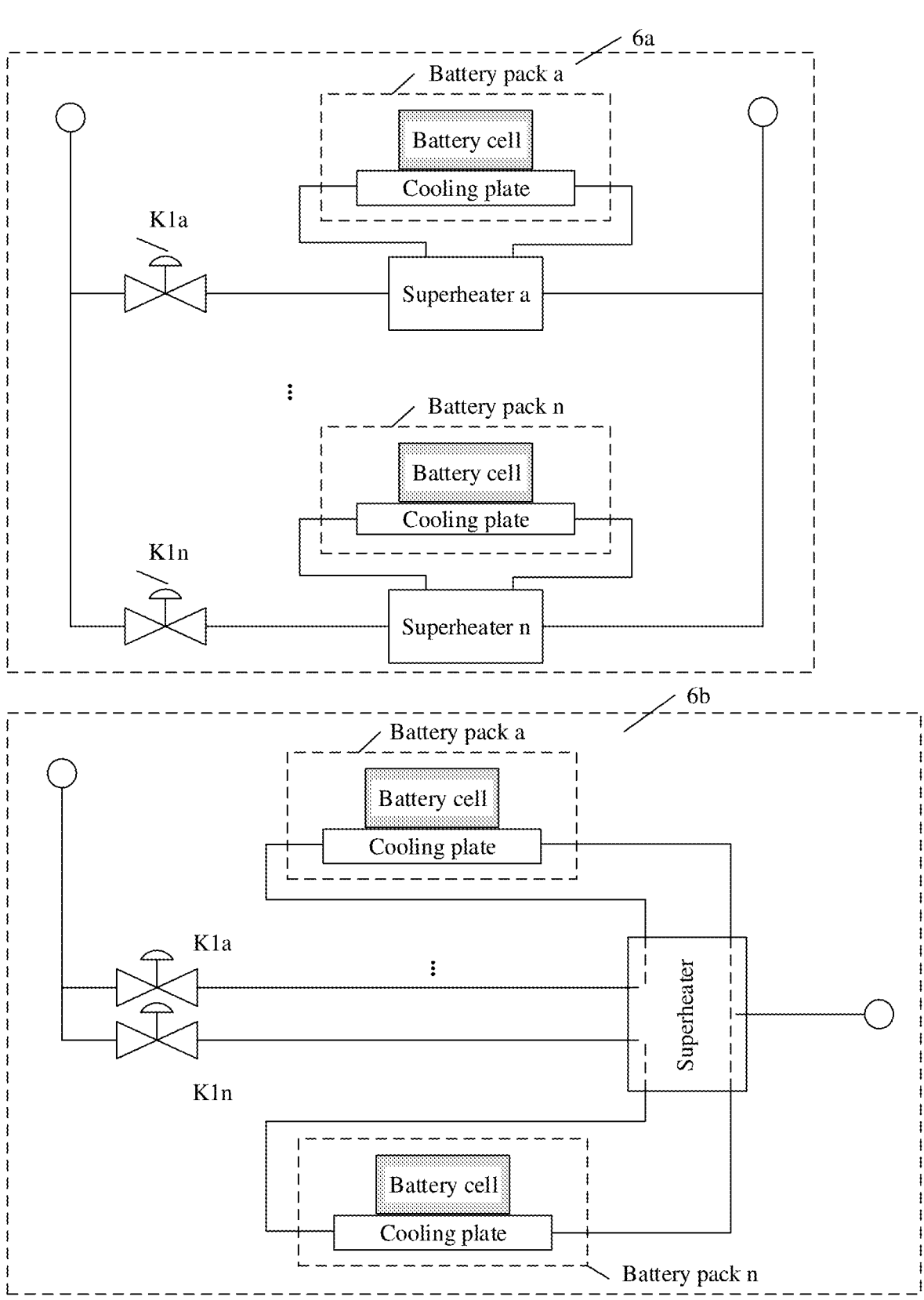
FIG. 6 is a schematic diagram of a partial connection relationship between a thermal management system and a plurality of battery packs.

In some feasible implementations, the energy storage system may further include a plurality of battery packs. FIG. 6 is a schematic diagram of a partial connection relationship between a thermal management system and a plurality of battery packs. As shown in 6*a* in FIG. 6, the energy storage system includes a plurality of battery packs (for example, a battery pack a to a battery pack n), and the thermal management system includes a plurality of first control valves (for example, K1*a* to K1*n*) and a plurality of first heating apparatuses (for example, a plurality of dispersedly-distributed superheaters a to n). Herein, a first inlet and outlet of a cooling plate in one battery pack is connected to one first control valve or connected to one first control valve by using one first heating apparatus (namely, one superheater), and a second inlet and outlet of the cooling plate in the one battery pack is connected to the inlet of the compressor by using the one first heating apparatus. Herein, thermal management media flowing through the battery packs may be aggregated after flowing out of the first heating apparatuses (namely, the superheater a to the superheater n) corresponding to the battery packs, and then a thermal management medium obtained through aggregation flows into the compressor. The control unit may be further configured to: when a battery cell temperature of any one battery pack is greater than or equal to the first temperature threshold, control opening of a first control valve connected to the any one battery pack, to control the thermal management medium to flow into a cooling plate in the any one battery pack to exchange heat with a battery cell in the any one battery pack, to decrease the battery cell temperature of the any one battery pack.

In some feasible implementations, as shown in 6b in FIG. 6, the energy storage system includes a plurality of battery packs (for example, a battery pack a to a battery pack n), and the thermal management system includes a plurality of first control valves (for example, K1a to K1n) and one first heating apparatus (for example, an integrated superheater). Herein, a first inlet and outlet of a cooling plate in one battery pack is connected to one first control valve or connected to one first control valve by using the one first heating apparatus, and a second inlet and outlet of the cooling plate in the one battery pack is connected to the inlet of the compressor by using the one first heating apparatus. Herein, thermal management media flowing through the battery packs may separately flow into the first heating apparatus (namely, the superheater), and a thermal management medium obtained through aggregation in the first heating apparatus flows into the compressor. The control unit may be further configured to: when a battery cell temperature of any one battery pack is greater than or equal to the first temperature threshold, control opening of a first control valve connected to the any one battery pack to control the thermal management medium to flow into a cooling plate in the any one battery pack to exchange heat with a battery cell in the any one battery pack, to decrease the battery cell temperature of the any one battery pack.

In some feasible implementations, the control unit may obtain battery cell temperatures of the battery packs. When a battery cell temperature of any battery pack (for example, a target battery pack) is greater than or equal to the first temperature threshold, the control unit may control opening of a first control valve connected to the battery pack to control the thermal management medium to flow into a cooling plate in the battery pack to exchange heat with a battery cell, to decrease the battery cell temperature. The first temperature threshold herein may be set by the control unit based on the empirical value, may be the rated highest safe temperature of the battery cell, or may be the highest temperature at which the battery cell can operate normally, where the highest temperature is calculated based on the current operating status of the energy storage system.

It may be understood that first temperature thresholds corresponding to the battery packs herein may be the same or may be different. It may be further understood that the control unit may separately control, based on the battery cell temperatures of the battery packs and the first temperature thresholds corresponding to the battery packs, opening of the first control valves connected to the battery packs. Herein, the control unit may obtain the temperature and/or the pressure of the thermal management medium at the outlet of the compressor, and control, based on the temperature and/or the pressure of the thermal management medium at the outlet of the compressor and a battery cell temperature of the target battery pack, opening of a first control valve connected to the target battery pack. In this way, a flow rate (or a flow) at which the thermal management medium flows into a cooling plate in the target battery pack is controlled, heat of a battery cell can be absorbed by the thermal management medium flowing through the cooling plate, and the battery cell temperature of the target battery pack is decreased (for example, the battery cell temperature is decreased to the safe operating temperature range). A structure is simple, thermal management costs are low, thermal management efficiency is high, system safety is high, and applicability is high.

Figure 7:
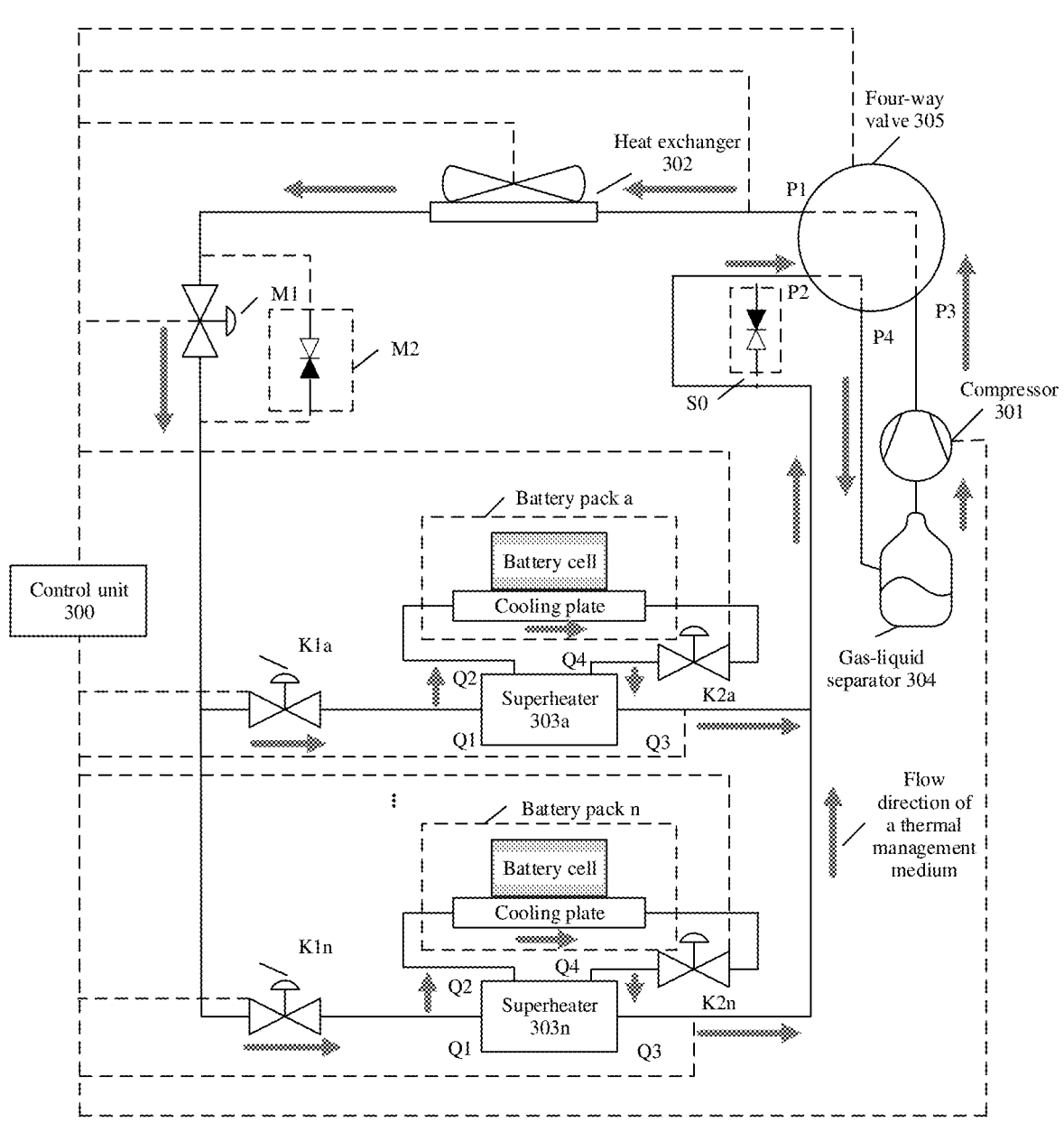
FIG. 7 is a schematic diagram of another structure of an energy storage system.

In some feasible implementations, the thermal management system further includes a lumped control valve. FIG. 7 is a schematic diagram of another structure of an energy storage system. As shown in FIG. 7, one end of the lumped control valve (an expansion valve M1 or a check valve M2) may be connected to the heat exchanger 302, and the other end of the lumped control valve may be connected to the battery packs through the first control valves (K1a to K1n) corresponding to the battery packs (the battery pack a to the battery pack n). The lumped control valve may be the expansion valve M1 (or another valve having a flow control function), and the first control valve may be an expansion valve or a solenoid valve (or another valve having a flow control function or an on/off function). Alternatively, the lumped control valve may be the check valve M2 (or another valve having a flow control function or an on/off function), and the first control valve may be an expansion valve (or another valve having a flow control function). That is, the thermal management system may use a combination of valves with different functions as the lumped control valve and the first control valve, to control flows (or flow rates) of thermal management media flowing through the battery packs. A structure is simple, a control operation is simple, costs are low, and applicability is high.

In some feasible implementations, to further improve flexibility of the thermal management system, the thermal management system may further include a four-way valve 305. Refer to FIG. 7 again. As shown in FIG. 7, one end of the heat exchanger 302 may be connected to first inlets and outlets of cooling plates in the battery packs (the battery pack a to the battery pack n) through the lumped control valve (M1 and M2) and the first control valves (K1a to K1n). The other end of the heat exchanger 302 may be connected to a first end P1 of the four-way valve 305. A second end P2 of the four-way valve 305 may be connected to second inlets and outlets of the cooling plates in the battery packs, a third end P3 of the four-way valve 305 may be connected to the outlet of the compressor 301, and a fourth end P4 of the four-way valve 305 may be connected to the inlet of the compressor 301 or connected to the inlet of the compressor 301 by using the gas-liquid separator 304. Herein, the control unit 300 may be further configured to: when the battery cell temperature of the battery pack is greater than or equal to the first temperature threshold, control the four-way valve 305 to connect the outlet of the compressor 301 and the heat exchanger 302, and connect the second inlet and outlet of the cooling plate in the battery pack and the inlet of the compressor 301, to control the thermal management medium to flow into the cooling plate in the battery pack to exchange heat with the battery cell, to decrease the battery cell temperature.

In some feasible implementations, the thermal management system may further include a check valve S0. The check valve S0 is connected between the second inlets and outlets of the cooling plates in the battery packs and the second end P2 of the four-way valve 305 and is configured to prevent backflow of the thermal management medium. It may be understood that the control unit 300 may control the four-way valve 305 to change a connection manner of the four ends, to change a connection manner in the thermal management system. When the battery cell temperature needs to be decreased, the control unit 300 may control the four-way valve 305, so that the thermal management medium output by the compressor 301 may flow in from the first inlet and outlet of the cooling plate in the battery pack by using the heat exchanger 302 and the first control valve, and flow out from the second inlet and outlet of the cooling plate in the battery pack, to decrease the battery cell temperature. A structure is simple, a control operation is simple, costs are low, and applicability is high.

It may be further understood that, in a process of decreasing battery cell temperatures by using thermal management media, as shown in FIG. 7, flow directions of the thermal management media are shown by gray arrows. The control unit 300 may obtain the battery cell temperatures inside the battery packs and status parameters (such as a temperature, pressure, or other status parameters) of thermal management media in different positions in the system; and control operating parameters of the valves and the components in the system based on these status parameters. For example, the control unit 300 may obtain a status parameter of a thermal management medium at the first end P1 of the four-way valve 305 and status parameters of thermal management media flowing out of the battery packs (when the battery packs are connected to different superheaters, status parameters of thermal management media flowing from outlets of the superheaters to the four-way valve may be obtained); and control the operating parameters of the valves and the components such as the lumped control valve (M1 or M2), the four-way valve 305, the first control valves (K1a to K1n), the second control valves (K2a to K2n), the heat exchanger 302, and the compressor 301 based on the status parameters. In addition to decreasing the battery cell temperatures by using the thermal management media, the operating parameters of the valves and the components are controlled and adjusted, to ensure that the system can operate safely and normally. In this way, energy consumption of the system is reduced, and operating efficiency of the system is improved.

Figure 8:
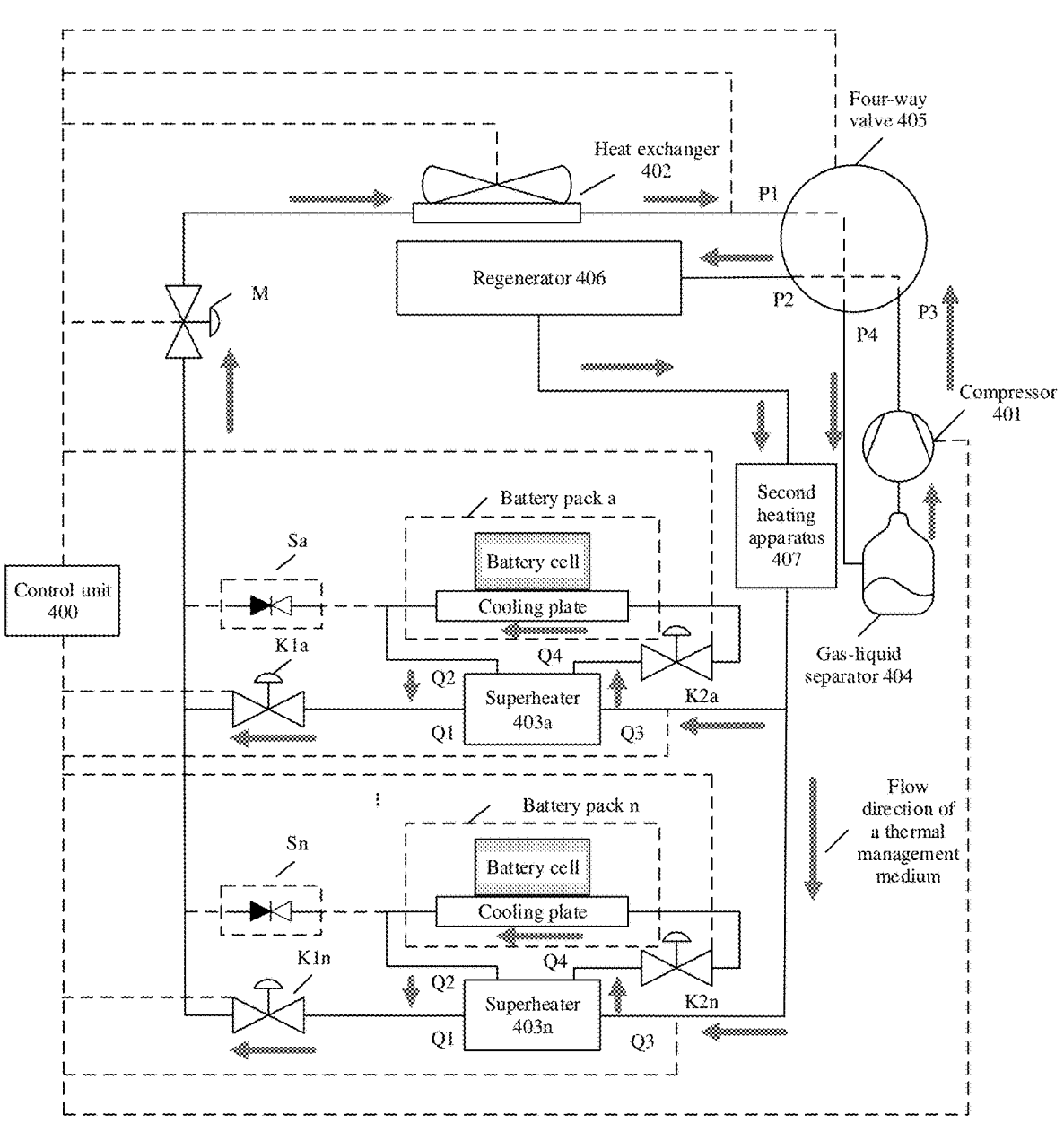
FIG. 8 is a schematic diagram of another structure of an energy storage system.

In some feasible implementations, the thermal management system may further increase the battery cell temperature by using the thermal management medium. For details, refer to FIG. 8. FIG. 8 is a schematic diagram of another structure of an energy storage system. As shown in FIG. 8, when the battery cell temperature of the battery pack is less than or equal to a second temperature threshold, the control unit 400 may be further configured to control the four-way valve 405 to connect the outlet of the compressor 401 and the second inlet and outlet of the cooling plate in the battery pack and connect the heat exchanger 402 and the outlet of the compressor 401; and control the compressor 401 to heat the thermal management medium to control the thermal management medium to flow into the cooling plate in the battery pack to exchange heat with the battery cell, to increase the battery cell temperature. The second temperature threshold is less than the first temperature threshold. The second temperature threshold herein may be set by the control unit 400 based on an empirical value, may be a rated lowest safe temperature of the battery cell, or may be a lowest temperature at which the battery cell can operate normally, where the lowest temperature is calculated based on the current operating status of the energy storage system. The thermal management medium herein may be a refrigerant, a cooling working medium, or any flowable medium that is convenient to absorb or release heat energy. The thermal management medium may be gas, liquid, or a gas-liquid mixture, which may be determined based on an actual application scenario. This is not limited herein. The compressor 401 herein may compress and heat a gaseous thermal management medium, to improve pressure and a temperature of the thermal management medium and provide power for the thermal management medium to flow in the thermal management system. Herein, the control unit 400 may control the four-way valve 405 to change the connection manner of the four ends, so that the thermal management medium flowing out of the compressor 401 flows through the cooling plate in the battery pack to release heat to the battery cell, and the battery cell temperature is increased (for example, the battery cell temperature is increased to the normal operating temperature range). A structure is simple, thermal management costs are low, thermal management efficiency is high, system safety is high, and applicability is high.

In some feasible implementations, to further ensure that the compressor operates normally, the thermal management system may further include a regenerator. Refer to FIG. 8 again. As shown in FIG. 8, the regenerator 406 may be disposed adjacent to the heat exchanger 402, and the regenerator 406 may be connected between the second end P2 of the four-way valve 405 and the second inlets and outlets of the cooling plates in the battery packs. The regenerator 406 herein may be configured to heat a thermal management medium in the heat exchanger 402 by using heat energy of the thermal management medium flowing into the battery pack, to decrease the humidity of the thermal management medium flowing into the compressor 401. After the thermal management medium flows through the cooling plate in the battery pack to exchange heat energy with the battery cell, a part of thermal management medium may change to a liquid state because heat energy is decreased. The regenerator 406 may use heat energy of the thermal management medium flowing out of the compressor 401 (or the thermal management medium flowing into the compressor 401) to heat the thermal management medium in the heat exchanger 402, to decrease a percentage of the liquid thermal management medium in the thermal management medium flowing into the compressor 401. In this way, the liquid thermal management medium is prevented from flowing into the compressor 401 to cause the liquid impact phenomenon (the excessive liquid substances may impact the compressor after entering the compressor, and deformation or rupture of the compressor is caused), and the compressor 401 is ensured to operate safely. A structure is simple, safety is high, and applicability is high.

In some feasible implementations, when the temperature of the external environment (or an external environment of the thermal management system) is greater than an external environment temperature threshold, the control unit 400 may control the heat exchanger 402 to start and exchange heat with the thermal management medium output by the first control valve by using air of the external environment, to increase the temperature of the thermal management medium. The external environment temperature threshold herein may be set by the control unit 400 based on an empirical value or may be set based on a current temperature of the thermal management medium in the heat exchanger 402 (for example, the external environment temperature threshold may be a temperature greater than the current temperature of the thermal management medium in the heat exchanger 402). In other words, the heat exchanger 402 may use the air of the external environment to heat the thermal management medium output by the first control valve, to decrease the percentage of the liquid thermal management medium in the thermal management medium flowing into the compressor 401. On the basis of ensuring that the compressor 401 operates safely, heat energy in the external environment is used. A structure is simple, energy utilization is improved, and system operation costs are decreased.

In some feasible implementations, when the first heating apparatus is the superheater (or a heat transfer apparatus that performs heating by using heat energy of a thermal management medium in another position), the thermal management system further includes a second heating apparatus 407. As shown in FIG. 8, the second heating apparatus 407 may be connected between the second end P2 of the four-way valve 405 and the second inlets and outlets of the cooling plates in the battery packs. The second heating apparatus 407 may be configured to heat a thermal management medium output by the regenerator 406. A thermal management medium obtained through heating flows into the cooling plate in the battery pack to exchange heat with the battery cell, to increase the battery cell temperature. It may be understood that, when the temperature of the thermal management medium flowing out of the compressor 401 is low or the temperature of the thermal management medium flowing through the cooling plate in the battery pack is low in another case, and the temperature is insufficient to meet a requirement for heating the battery cell, the control unit 400 may control another heating apparatus (for example, the first heating apparatus or the second heating apparatus 407) to heat the thermal management medium to increase the temperature of the thermal management medium, to meet the requirement for heating the battery cell. It may be further understood that, if the first heating apparatus is the heater (or another heating apparatus that can generate heat energy by itself), the thermal management system may combine the second heating apparatus 407 with the first heating apparatus or cancel deployment of the second heating apparatus 407. The thermal management system may use the first heating apparatus to heat the thermal management medium output by the regenerator 406, and the thermal management medium obtained through heating flows into the cooling plate in the battery pack to exchange heat with the battery cell, to increase the battery cell temperature. The control unit 400 may control the first heating apparatus and/or the second heating apparatus 407 to heat the thermal management medium input to the cooling plate in the battery pack, to ensure that the thermal management medium flowing through the cooling plate in the battery pack has sufficient heat energy to increase the battery cell temperature. A structure is simple, safety is high, flexibility is high, and applicability is high.

In some feasible implementations, the lumped control valve M may be a bidirectional expansion valve (or another valve having a bidirectional flow control function), and the thermal management system may further include at least one first check valve. As shown in FIG. 8, the thermal management system includes a plurality of first check valves (Sa to Sn). Herein, one end of one first check valve S may be connected to the lumped control valve M, and the other end of the first check valve S may be connected to a first inlet and outlet of a cooling plate in one battery pack. Herein, the first check valve S may be configured to prevent a thermal management medium from flowing back from the lumped control valve M to the battery pack connected to the first check valve S. It may be understood that, when the first control valve is a bidirectional expansion valve (or another valve having a bidirectional flow control function), the first check valve S and/or the lumped control valve M may not be disposed in the thermal management system, and the thermal management system may control a flow (or a flow rate) of the thermal management medium input to the heat exchanger 402 by controlling the opening of the first control valve. That is, when a percentage of a liquid thermal management medium in the thermal management medium flowing into the heat exchanger 402 is high due to a low temperature, the control unit 400 may use different valve combinations and control corresponding valves to decrease the flow (or the flow rate) of the thermal management medium flowing through the heat exchanger 402, so that the thermal management medium in the heat exchanger 402 can absorb sufficient heat energy by using the regenerator 406 or the external environment. In this way, the liquid thermal management medium is prevented from flowing into the compressor 401 and causing the liquid impact phenomenon (the excessive liquid substances may impact the compressor after entering the compressor, and deformation or rupture of the compressor is caused), and the compressor 401 is ensured to operate safely. A structure is simple, an operation is simple, safety is high, and applicability is high.

It may be further understood that, in a process of increasing the battery cell temperatures by using the thermal management media, as shown in FIG. 8, flow directions of the thermal management media are shown by gray arrows. The control unit 400 may obtain the battery cell temperatures inside the battery packs and status parameters (such as a temperature, pressure, or other status parameters) of thermal management media in different positions in the system, and control operating parameters of the valves and the components in the system based on these status parameters. For example, the control unit 400 may obtain the status parameter of the thermal management medium at the first end P1 of the four-way valve 405 and the status parameters of the thermal management media flowing out of the battery packs (when the battery packs are connected to different superheaters, status parameters of thermal management media flowing from outlets of the superheaters to the heat exchanger may be obtained); and control the operating parameters of the valves and the components such as the lumped control valve M, the four-way valve 405, the first control valves (K1$a$ to K1$n$), the second control valves (K2$a$ to K2$n$), the heat exchanger 402, and the compressor 401 based on the status parameters. In addition to increasing the battery cell temperatures by using the thermal management media, the operating parameters of the valves and the components are controlled and adjusted, to ensure that the system can operate safely and normally. In this way, energy consumption of the system is reduced, and operating efficiency of the system is improved.

Figure 9:
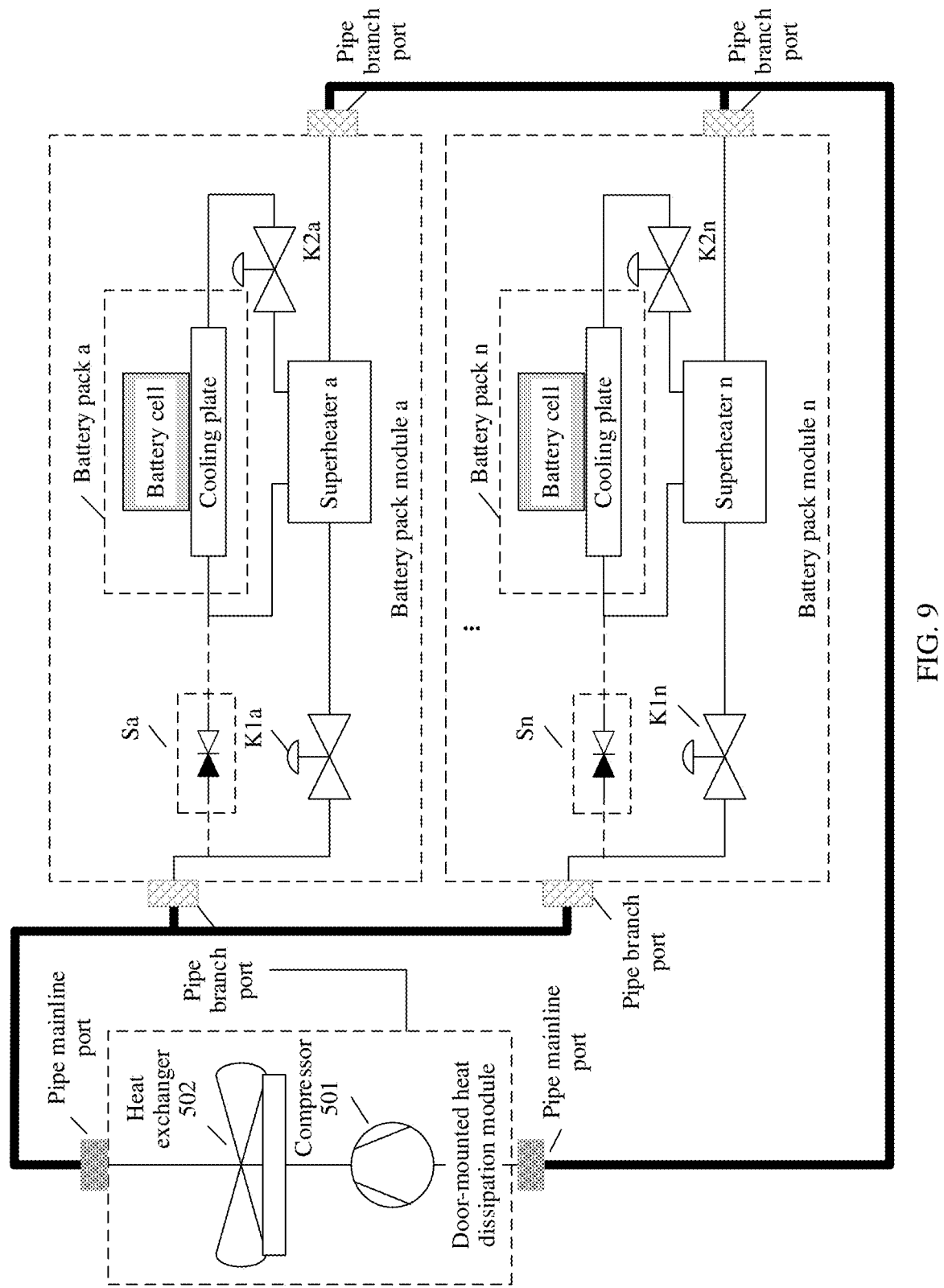
FIG. 9 is a schematic diagram of another structure of an energy storage system.

The embodiments may further provide an energy storage system. FIG. 9 is a schematic diagram of another structure of an energy storage system. The energy storage system may include the thermal management system in any one of the possible implementations described in FIG. 2 to FIG. 8. For ease of description, only a structure of the thermal management system (namely, a structure of the thermal management system in FIG. 2) when the thermal management medium is used to cool the battery cell is used as an example for description. As shown in FIG. 9, the energy storage system further includes a medium circulation pipe (used to circulate a thermal management medium). The medium circulation pipe includes a pair of pipe mainline ports and at least one pair of pipe branch ports. A first inlet and outlet of a cooling plate in one battery pack may be connected to one first control valve or connected to one first control valve by using one first heating apparatus (namely, one superheater), and a second inlet and outlet of the cooling plate in the one battery pack may be connected to the inlet of the compressor 601 by using the one superheater. Herein, the heat exchanger 602 and the compressor 601 in the thermal management system may be integrated into one door-mounted heat dissipation module. The door-mounted heat dissipation module is connected to the pipe mainline ports. The battery packs, the first control valves corresponding to the battery packs, and the superheaters corresponding to the battery packs may be integrated into at least one battery pack module. The battery pack module is connected to the pipe branch ports. The heat exchanger 602 and the compressor 601 in the energy storage system may be integrated into the door-mounted heat dissipation module, and the door-mounted heat dissipation module may be on a door or at an inlet and outlet of the energy storage system. In addition, the pipe branch ports connected to the battery pack module are connected to the pipe mainline ports, and the pipe mainline ports are connected to the door-mounted heat dissipation module, so that the door-mounted heat dissipation module can be flexibly moved, easy to maintain, and has high applicability. The energy storage system may also be integrated in another manner based on different application scenarios. However, another door-mounted energy storage system or an energy storage system with an inlet and outlet also falls within the scope of the embodiments. Details may be determined based on an application scenario, and details are not described herein again.

Figure 10:
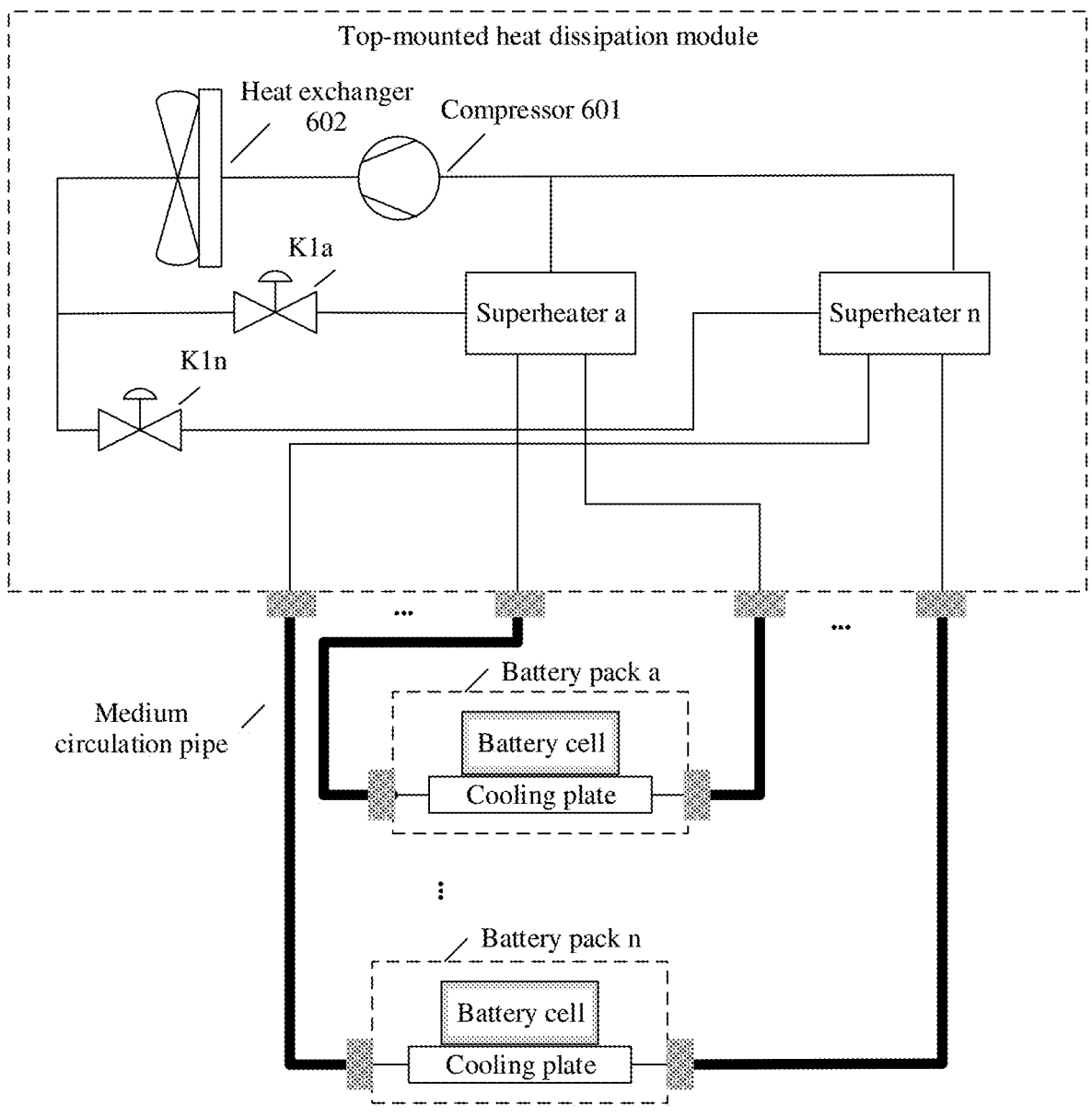
FIG. 10 is a schematic diagram of another structure of an energy storage system.

The embodiments may further provide an energy storage system. FIG. 10 is a schematic diagram of another structure of an energy storage system. The energy storage system may include the thermal management system in any one of the possible implementations described in FIG. 2 to FIG. 8. For ease of description, \only a structure of the thermal management system (namely, a structure of the thermal management system in FIG. 2) when the thermal management medium is used to cool the battery cell is used as an example for description. As shown in FIG. 10, the energy storage system further includes a plurality of medium circulation pipes (used to circulate a thermal management medium). The heat exchanger 602, the compressor 601, the first control valves, and the first heating apparatuses (namely, the superheaters) in the thermal management system may be integrated into one top-mounted heat dissipation module. The top-mounted heat dissipation module may be connected to ends of the plurality of medium circulation pipes, and the battery packs may be connected to other ends of the plurality of medium circulation pipes. The heat exchanger 602, the compressor 601, the first control valves, and the superheaters in the energy storage system may be integrated into the top-mounted heat dissipation module, the top-mounted heat dissipation module may be disposed on the top of the energy storage system, and the top-mounted heat dissipation module and the battery packs are connected through the plurality of medium circulation pipes. This can improve integration of the energy storage system, increase energy density of the energy storage system, and improve thermal management efficiency of the energy storage system. The energy storage system may also be integrated in another manner based on different application scenarios. However, another top-mounted energy storage system or an energy storage system that is integrated with a battery pack and a heat dissipation module also falls within the scope of the embodiments. Details may be determined based on an application scenario, and details are not described herein again.

Figure 11:
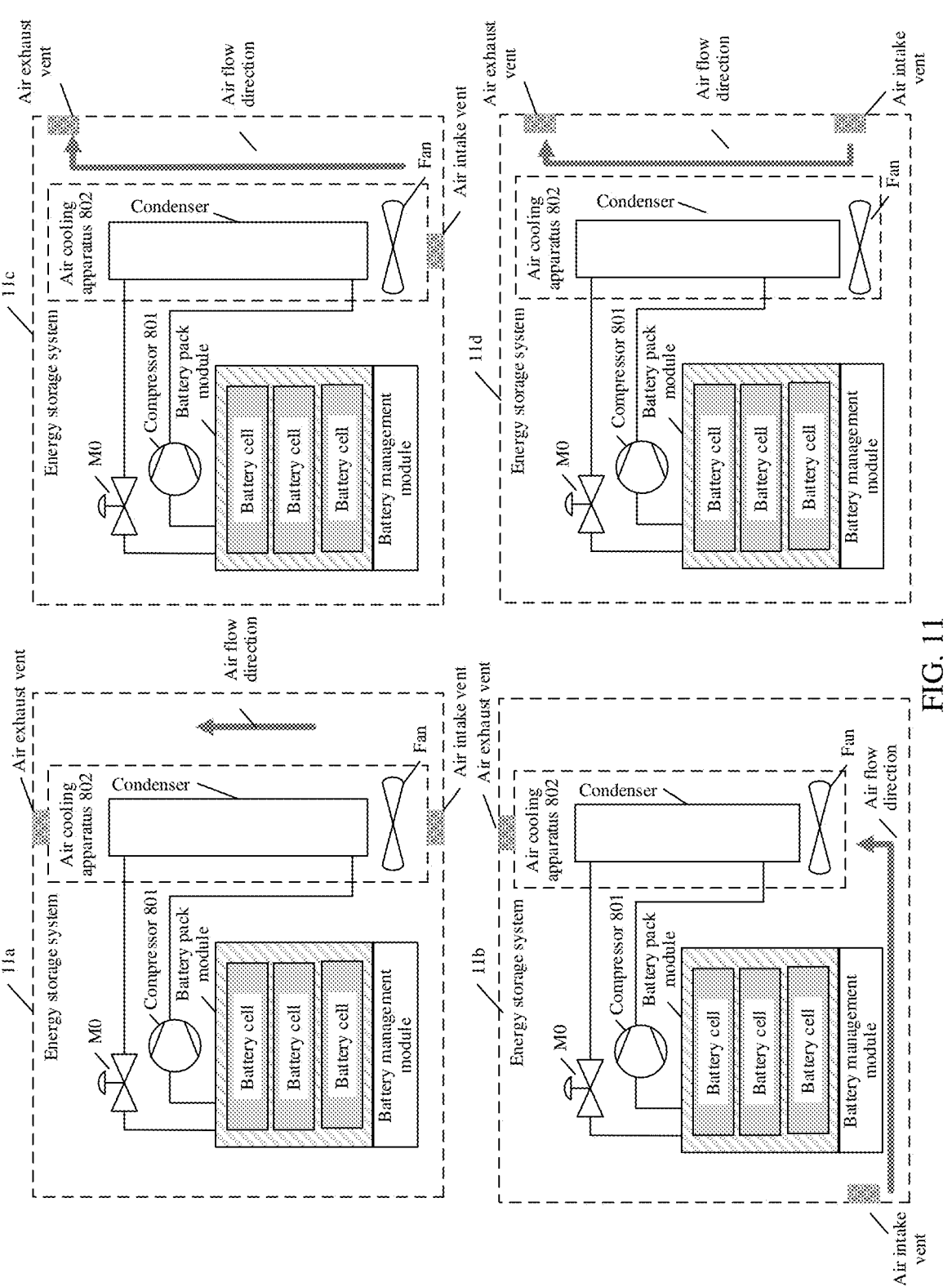
FIG. 11 is a schematic diagram of another structure of an energy storage system.

The embodiments may further provide an energy storage system. FIG. 11 is a schematic diagram of another structure of an energy storage system. The energy storage system may include the thermal management system in any one of the possible implementations described in FIG. 2 to FIG. 8. For ease of description, only a structure of the thermal management system (namely, the structure of the thermal management system in FIG. 2) when the thermal management medium is used to cool the battery cell is used as an example for description. As shown in FIG. 11, the battery packs in the energy storage system may be integrated into a battery pack module, and the first control valves in the thermal management system are integrated into a module expansion valve M0. One end of the battery pack module herein may be connected to the heat exchanger (namely, an air cooling apparatus 802) through the module expansion valve, and the other end of the battery pack module may be connected to the compressor 801 (or connected to the compressor 801 by using the gas-liquid separator). The compressor 801 is connected to the heat exchanger. The heat exchanger herein may be configured to cool a thermal management medium output by the battery pack module. Integration of the energy storage system is improved, energy density of the energy storage system is increased, and thermal management efficiency of the energy storage system is improved.

Figure 12:
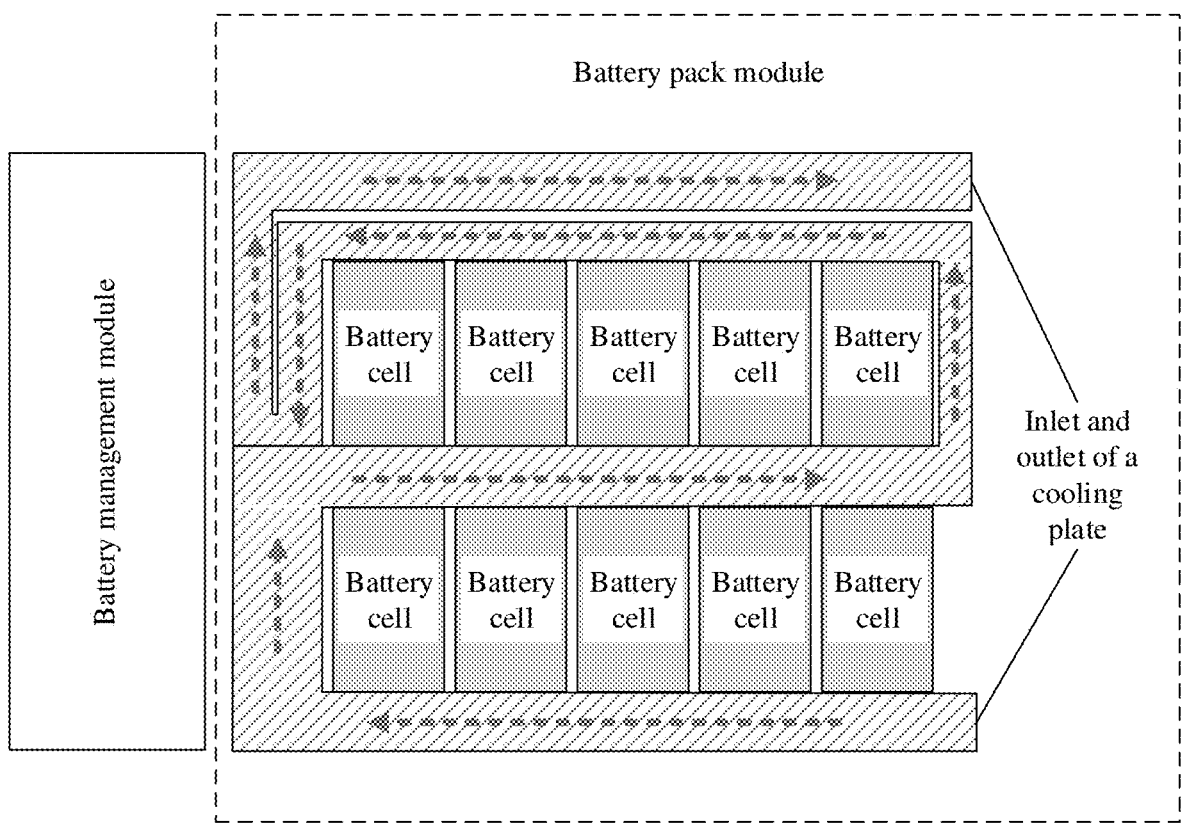
FIG. 12 is a schematic diagram of structures of a battery pack module and a battery management module in an energy storage system.

In some feasible implementations, the energy storage system further includes a battery management module. For details, refer to FIG. 12. FIG. 12 is a schematic diagram of structures of a battery pack module and a battery management module in an energy storage system. As shown in FIG. 12, the battery cells are surrounded by the cooling plates, to ensure that the cooling plates have a sufficiently large contact area with the battery cells. The battery management module comes in contact with the cooling plates in the battery pack module. Flow directions of thermal management media in the cooling plates may be shown by arrows in FIG. 12. The energy storage system may further heat the thermal management media in the cooling plates by using the battery management module, to decrease humidity of the thermal management media flowing into the compressor 801. In other words, the energy storage system may use heat energy generated by the battery management module to heat the thermal management media flowing into the compressor 801, to ensure that the compressor 801 operates safely. A structure is simple, energy utilization is high, and costs are low.

Further refer to FIG. 11. It may be understood that the heat exchanger in the energy storage system may be the air cooling apparatus 802, a water cooling apparatus, or another apparatus that can perform heat dissipation. Herein, for ease of description, only an example in which the air cooling apparatus 802 including a condenser and a fan is used as a heat exchanger is used to describe the structure of the energy storage system. As shown in 11a, 11b, 11c, and 11d in FIG. 11, when the heat exchanger is the air cooling apparatus 802, the energy storage system may further include an air intake vent and an air exhaust vent. The air cooling apparatus 802 may be configured to cool, through the air intake vent and the air exhaust vent, the thermal management medium output by the battery pack module. A structure is simple, and applicability is high. It may be understood that when the air intake vent and the air exhaust vent of the energy storage system are disposed in different directions, air flow directions in the energy storage system are also different (as shown by gray arrows in FIG. 11). As shown in 11a, the air intake vent and the air exhaust vent of the energy storage system may be oppositely disposed at two ends of the air cooling apparatus 802. In this case, air flows straightly along a direction of the air cooling apparatus 802. The air cooling apparatus 802 may cool, through the air intake vent and the air exhaust vent, the thermal management medium output by the battery pack module. As shown in 11b, the air intake vent of the energy storage system may be disposed near the battery management module, and the air exhaust vent may be disposed at one end of the air cooling apparatus 802. In this case, air flows in a direction from the battery management module to the air cooling apparatus 802. The air cooling apparatus 802 may cool, through the air intake vent and the air exhaust vent, the thermal management medium output by the battery pack module and the battery management module. As shown in 11c, the air intake vent of the energy storage system may be disposed at one end of the air cooling apparatus 802, and the air exhaust vent may be disposed on a side of the other end of the air cooling apparatus 802. In this case, air flows along a direction of the air cooling apparatus 802 and flows out from the side. The air cooling apparatus 802 may cool, through the air intake vent and the air exhaust vent, the thermal management medium output by the battery pack module. As shown in 11d, the air intake vent and the air exhaust vent of the energy storage system may be disposed on a same side of two ends of the air cooling apparatus 802. In this case, air flows in from the side, flows in a direction of the air cooling apparatus 802, and flows out from the side. The air cooling apparatus 802 may cool, through the air intake vent and the air exhaust vent, the thermal management medium output by the battery pack module. The foregoing descriptions are merely some feasible layout positions of the air intake vent and the air exhaust vent. Layout positions and quantities of air intake vents and air exhaust vents of the energy storage system may be flexibly changed based on different application scenarios. Alternatively, other inlets and outlets or channels (for example, a pipe of a water cooling apparatus) used to transfer a medium may be disposed based on different types of radiators (for example, the water cooling apparatus). Details are not described herein again.

Figure 13:
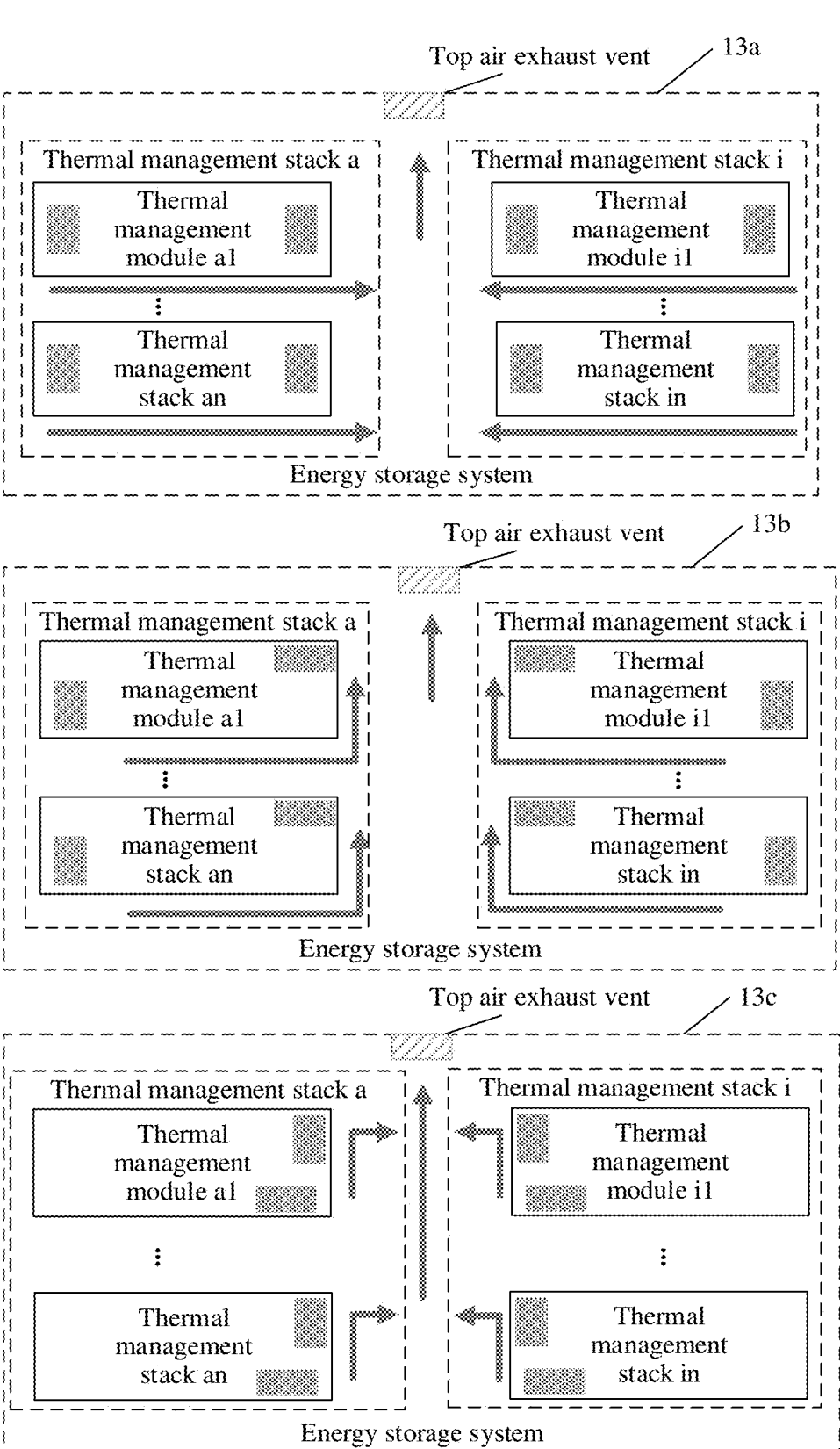
FIG. 13 is a schematic diagram of another structure of an energy storage system.

The embodiments may provide an energy storage system. FIG. 13 is a schematic diagram of another structure of an energy storage system. The energy storage system includes a top air exhaust vent and a plurality of thermal management systems in any one of the possible implementations described in FIG. 2 to FIG. 8. As shown in FIG. 13, thermal management systems and battery packs (the battery management module may also be included) in the energy storage system may be integrated into thermal management modules. The thermal management modules in the energy storage system may be stacked and distributed to form a plurality of thermal management stacks. The thermal management stacks are symmetrically distributed by using the top air exhaust vent as a center. In this way, the energy storage system has high integration, high energy density, and high thermal management efficiency.

It may be understood that when air intake vents and air exhaust vents of the thermal management modules are disposed in different directions, air flow directions in the energy storage system and the thermal management modules are also different (as shown by gray arrows in FIG. 13). With reference to FIG. 11, as shown in 11a in FIGS. 11 and 13a in FIG. 13, the air intake vent and the air exhaust vent of the thermal management module may be oppositely disposed at two ends (for example, a left side and a right side) of the thermal management module. In this case, air inside the thermal management module flows straightly along a direction of the thermal management module, and air outside the thermal management module may flow out of the energy storage system through the top air exhaust vent, to cool the energy storage system. As shown in 11b in FIGS. 11 and 13b in FIG. 13, the air intake vent of the thermal management module may be disposed on a lower part of one side, and the air exhaust vent may be disposed on the top of the other side of the thermal management module. In this case, air inside the thermal management module flows along the bottom of the thermal management module to the air exhaust vent on the top of the other side of the thermal management module, and air outside the thermal management module may flow out of the energy storage system through the air exhaust vent on the top, to cool the energy storage system. As shown in 11c in FIGS. 11 and 13c in FIG. 13, the air intake vent of the thermal management module may be disposed at the bottom of the thermal management module, and the air exhaust vent may be disposed on the upper part of one side of the thermal management module. In this case, air inside the thermal management module flows to the air exhaust vent on the upper part of one side of the thermal management module along the side of the thermal management module, and air outside the thermal management module may flow out of the energy storage system through the air exhaust vent on the upper part, to cool the energy storage system.

In some feasible implementations, the energy storage system further includes a flow diversion apparatus (for example, a ventilation pipe), and the flow diversion apparatus may be disposed at the top air exhaust vent. Herein, the flow diversion apparatus may be configured to improve a heat dissipation capability of the energy storage system and has a simple structure and high applicability. The foregoing descriptions are merely some feasible layout positions of the air intake vent, the air exhaust vent, and the top air exhaust vent. Layout positions and quantities of air intake vents and air exhaust vents of the thermal management module and top air exhaust vents of the energy storage system may be flexibly changed based on different application scenarios. Alternatively, other inlets and outlets or channels (for example, a ventilation pipe or a pipe of a water cooling apparatus) used to transfer a medium may be disposed based on different types of radiators (for example, the water cooling apparatus). Details are not described herein again.

Figure 14:
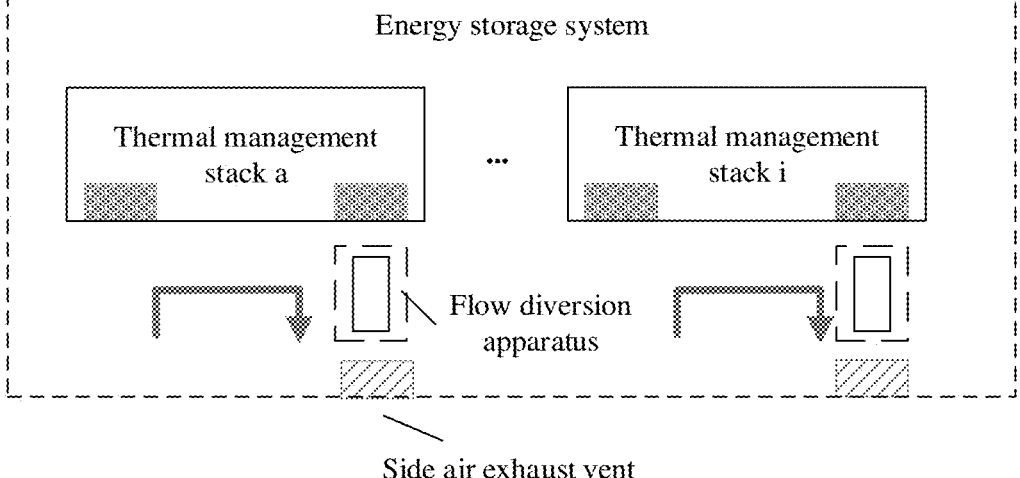
FIG. 14 is a schematic diagram of another structure of an energy storage system.

The embodiments may provide an energy storage system. FIG. 14 is a schematic diagram of another structure of an energy storage system. The energy storage system includes a side air exhaust vent and a plurality of thermal management systems in any one of the possible implementations described in FIG. 2 to FIG. 8. As shown in FIG. 14, thermal management systems and battery packs (the battery management module may also be included) in the energy storage system may be integrated into thermal management modules. The thermal management modules in the energy storage system may be stacked and distributed to form a plurality of thermal management stacks, and the thermal management stacks are evenly distributed based on the side air exhaust vent. The energy storage system may have high integration, high energy density, and high thermal management efficiency.

It may be understood that when air intake vents and air exhaust vents of the thermal management modules are disposed in different directions, air flow directions in the thermal management modules are also different (as shown by gray arrows in FIG. 14). With reference to FIG. 11, as shown in 11d in FIG. 11 and FIG. 14, the air intake vent and the air exhaust vent of the thermal management module may be disposed opposite to each other on the same side of the thermal management module. In this case, air inside the thermal management module flows in from the air intake vent at one end of the side and flows along a direction of the side of the thermal management module to the air exhaust vent at the other end of the side of the thermal management module. Air outside the thermal management module may flow out of the energy storage system through the side air exhaust vent, to cool the energy storage system.

In some feasible implementations, the energy storage system further includes a flow diversion apparatus (for example, a ventilation pipe), and the flow diversion apparatus may be disposed at the side air exhaust vent. Herein, the flow diversion apparatus may be configured to divert air to flow to the side air exhaust vent, to improve a heat dissipation capability of the energy storage system. The flow diversion apparatus has a simple structure and high applicability. The foregoing descriptions are merely some feasible layout positions of the air intake vent, the air exhaust vent, and the side air exhaust vent. Layout positions and quantities of air intake vents and air exhaust vents of the thermal management module and side air exhaust vents of the energy storage system may be flexibly changed based on different application scenarios. Alternatively, other inlets and outlets or channels (for example, a ventilation pipe or a pipe of a water cooling apparatus) used to transfer a medium may be disposed based on different types of radiators (for example, the water cooling apparatus). Details are not described herein again.

In an implementation, for more operations performed by the control unit in the energy storage system, refer to the implementations performed by the control unit in the energy storage system shown in FIG. 2 to FIG. 14. Details are not described herein again.

The thermal management system of the energy storage system may enable the thermal management medium to flow through the cooling plate to exchange heat with the battery cell, to increase or decrease the battery cell temperature. A structure is simple, thermal management costs are low, thermal management efficiency is high, system safety is high, and applicability is high.

The foregoing descriptions are merely implementations but are not intended to limit the scope of the embodiments. Any variation or replacement readily figured out by a person skilled in the art shall be within the scope of the embodiments.

What is claimed is:

1. An energy storage system, comprising:
   at least one battery pack further comprising:
      a cooling plate and
      a battery cell, wherein the cooling plate is configured to contact the battery cell to transfer heat energy; and
   a thermal management system further comprising:
      a control unit,
      a compressor,
      a heat exchanger, and
      at least one first control valve, wherein an outlet of the compressor is connected to the heat exchanger, the heat exchanger is connected to a first inlet and an outlet of the cooling plate in the at least one battery pack through the at least one first control valve, a second inlet and outlet of the cooling plate in the at least one battery pack is connected to an inlet of the compressor, and the control unit is configured to, when a battery cell temperature of the at least one battery pack is greater than or equal to a first temperature threshold;
      control the compressor to compress a thermal management medium, so that a thermal management medium flows into the heat exchanger, and
      control opening of the at least one first control valve to control the thermal management medium to flow into the cooling plate in the at least one battery pack to exchange heat with the battery cell, to decrease the battery cell temperature.

2. The energy storage system according to claim 1, wherein the thermal management system further comprises:
   a first heating apparatus, the second inlet and outlet of the cooling plate in the at least one battery pack are connected to the inlet of the compressor by using the first heating apparatus, and
   the first heating apparatus is configured to heat a thermal management medium flowing out of the at least one battery pack to an overheated state, to decrease humidity of a thermal management medium flowing into the compressor.

3. The energy storage system according to claim 2, wherein the first heating apparatus is a superheater configured to heat, by using heat energy of the thermal management medium flowing into the at least one battery pack, the thermal management medium flowing out of the at least one battery pack to the overheated state, to decrease the humidity of the thermal management medium flowing into the compressor.

4. The energy storage system according to claim 3, wherein one end of the superheater is connected to the at least one first control valve and the first inlet and outlet of the cooling plate in the at least one battery pack, and the other end of the superheater is connected to the second inlet and outlet of the cooling plate in the at least one battery pack and the inlet of the compressor.

5. The energy storage system according to claim 3, wherein one end of the superheater is connected to the heat exchanger and the at least one first control valve, and the other end of the superheater is connected to the second inlet and outlet of the cooling plate in the at least one battery pack and the inlet of the compressor.

6. The energy storage system according to claim 3, wherein one end of the superheater is connected to the outlet of the compressor and the heat exchanger, and the other end of the superheater is connected to the second inlet and outlet of the cooling plate in the at least one battery pack and the inlet of the compressor.

7. The energy storage system according to claim 1, wherein the thermal management system further comprises:
   a gas-liquid separator, the second inlet and outlet of the cooling plate in the at least one battery pack are is connected to the inlet of the compressor by using the first heating apparatus and the gas-liquid separator, and the gas-liquid separator is configured to separate gas and liquid of a thermal management medium obtained through heating by the first heating apparatus, to decrease humidity of the thermal management medium flowing into the compressor.

8. The energy storage system according to claim 1, wherein the thermal management system further comprises:
   a second control valve connected between the second inlet and outlet of the cooling plate in the at least one battery pack and the first heating apparatus, and the second control valve is configured to control a flow of a thermal management medium input to the first heating apparatus from the second inlet and outlet of the cooling plate in the at least one battery pack.

9. The energy storage system according to claim 1, further comprising:
   a plurality of battery packs, wherein the thermal management system further comprises:
   a plurality of first control valves, and a plurality of first heating apparatuses, a first inlet and outlet of a cooling plate in one battery pack of the plurality of battery packs is connected to one first control valve of the plurality of first control valves or connected to the one first control valve by using one first heating apparatus, and a second inlet and outlet of the cooling plate in the one battery pack is connected to the inlet of the compressor by using the one first heating apparatus; and the control unit is further configured to, when a battery cell temperature of any one battery pack of the plurality of battery packs is greater than or equal to the first temperature threshold;

control opening of a first control valve of the plurality of first control valves connected to the any one battery pack to control the thermal management medium to flow into a cooling plate in the any one battery pack to exchange heat with a battery cell in the any one battery pack, to decrease the battery cell temperature of the any one battery pack of the plurality of battery packs.

10. The energy storage system according to claim 1, further comprising:

a plurality of battery packs, wherein the thermal management system further comprises:

a plurality of first control valves, and one first heating apparatus, a first inlet and outlet of a cooling plate in one battery pack of the plurality of battery packs is connected to one first control valve of the plurality of first control valves or connected to the one first control valve by using the first heating apparatus, and a second inlet and outlet of the cooling plate in the one battery pack is connected to the inlet of the compressor by using the first heating apparatus; and the control unit is further configured to, when a battery cell temperature of any one battery pack of the plurality of battery packs is greater than or equal to the first temperature threshold:

control opening of a first control valve of the plurality of first control valves connected to the any one battery pack to control the thermal management medium to flow into a cooling plate in the any one battery pack to exchange heat with a battery cell in the any one battery pack, to decrease the battery cell temperature of the any one battery pack of the plurality of battery packs.

11. The energy storage system according to claim 9, wherein the thermal management system further comprises:

a lumped control valve, one end of the lumped control valve is connected to the heat exchanger, and the other end of the lumped control valve is connected to the plurality of battery packs through the first control valves corresponding to the plurality of battery packs; and the lumped control valve is an expansion valve, and the first control valve is an expansion valve or a solenoid valve; or the lumped control valve is a check valve, and the first control valve is an expansion valve.

12. The energy storage system according to claim 9, wherein the thermal management system further comprises:

a four-way valve, one end of the heat exchanger is connected to first inlets and outlets of cooling plates in the plurality of battery packs through the first control valves, the other end of the heat exchanger is connected to a first end of the four-way valve, a second end of the four-way valve is connected to second inlets and outlets of the cooling plates in the plurality of battery packs, a third end of the four-way valve is connected to the outlet of the compressor, and a fourth end of the four-way valve is connected to the inlet of the compressor or connected to the inlet of the compressor by using the gas-liquid separator; and the control unit is further configured to, when the battery cell temperature of the plurality of battery packs is greater than or equal to the first temperature threshold;

control the four-way valve to connect the outlet of the compressor and the heat exchanger and connect the second inlet and outlet of the cooling plate in the plurality of battery packs and the inlet of the compressor, to control the thermal management medium to flow into the cooling plate in the plurality of battery packs to exchange heat with the battery cell, to decrease the battery cell temperature.

13. The energy storage system according to claim 12, wherein the control unit is further configured to, when the battery cell temperature of the plurality of battery packs is less than or equal to a second temperature threshold:

control the four-way valve to connect the outlet of the compressor and the second inlet and outlet of the cooling plate in the plurality of battery packs and connect the heat exchanger and the outlet of the compressor, and control the compressor to heat the thermal management medium to control the thermal management medium to flow into the cooling plate in the plurality of battery packs to exchange heat with the battery cell, to increase the battery cell temperature, wherein the second temperature threshold is less than the first temperature threshold.

14. The energy storage system according to claim 13, wherein the thermal management system further comprises:

a regenerator disposed adjacent to the heat exchanger, and is connected between the second end of the four-way valve and the second inlets and outlets of the cooling plates in the plurality of battery packs, and wherein the regenerator is configured to heat a thermal management medium in the heat exchanger by using the heat energy of the thermal management medium flowing into the plurality of battery packs, to decrease the humidity of the thermal management medium flowing into the compressor.

15. The energy storage system according to claim 13, wherein the heat exchanger is configured to start when a temperature of an external environment is greater than an external environment temperature threshold, and exchange heat with a thermal management medium output by the first control valve by using air of the external environment, to increase a temperature of the thermal management medium.

16. The energy storage system according to claim 13, wherein when the first heating apparatus is a superheater, the thermal management system further comprises:

a second heating apparatus connected between the second end of the four-way valve and the second inlets and outlets of the cooling plates in the plurality of battery packs; and figured to heat a thermal management medium output by the regenerator, and a thermal management medium obtained through heating flows into the cooling plate in the plurality of battery packs to exchange heat with the battery cell, to increase the battery cell temperature.

17. The energy storage system according to claim 13, wherein when the thermal management system further comprises a lumped control valve that is the an expansion valve, the thermal management system further comprises:

a first check valve, wherein one end of the first check valve is connected to the lumped control valve, and the other end of the first check valve is connected to a first inlet and outlet of a cooling plate in one battery pack of the plurality of battery packs, and the first check valve is configured to prevent the thermal management medium from flowing back from the lumped control valve to the one battery pack connected to the first check valve.

18. The energy storage system according to claim 1, wherein the energy further comprising:

a medium circulation pipe comprising a pair of pipe mainline ports and at least one pair of pipe branch ports, wherein a first inlet and outlet of a cooling plate in one battery pack of the plurality of battery packs is connected to one first control valve or connected to one first control valve by using one first heating apparatus, and a second inlet and outlet of the cooling plate in the one battery pack is connected to the inlet of the compressor by using the one first heating apparatus; and the heat exchanger and the compressor in the thermal management system are integrated into one door-mounted heat dissipation module, the door-mounted heat dissipation module is connected to the pipe mainline ports, the plurality of battery packs, the first control valves corresponding to the battery packs, and the first heating apparatuses corresponding to the plurality of battery packs are integrated into at least one battery pack module, and the at least one battery pack module is connected to the pipe branch ports.

19. The energy storage system according to claim 18, further comprising:

a plurality of medium circulation pipes, wherein the heat exchanger, the compressor, the first control valves, and the first heating apparatuses in the thermal management system are integrated into a top-mounted heat dissipation module, the top-mounted heat dissipation module is connected to ends of the plurality of medium circulation pipes, and the plurality of battery packs is connected to other ends of the plurality of medium circulation pipes.

20. The energy storage system according to claim 9, wherein the plurality of battery packs in the energy storage system is integrated into a battery pack module, and the first control valves in the thermal management system are integrated into a module expansion valve; one end of the battery pack module is connected to the heat exchanger through the module expansion valve, the other end of the battery pack module is connected to the compressor or connected to the compressor by using the gas-liquid separator, and the compressor is connected to the heat exchanger; and the heat exchanger is configured to cool a thermal management medium output by the battery pack module.

21. The energy storage system according to claim 20, further comprising:

a battery management module configured to come in contact with cooling plates in the battery pack module to transfer heat energy, to decrease the humidity of the thermal management medium flowing into the compressor.

22. The energy storage system according to claim 20, wherein the heat exchanger is an air cooling apparatus, and further comprising:

an air intake vent; and an air exhaust vent, wherein the heat exchanger is configured to cool, through the air intake vent and the air exhaust vent, the thermal management medium output by the battery pack module.

23. The energy storage system according to claim 22, wherein the heat exchanger is further configured to cool the battery management module through the air intake vent and the air exhaust vent.

24. The energy storage system according to claim 9, further comprising:

a top air exhaust vent, wherein thermal management systems and the plurality of battery packs in the energy storage system are integrated into thermal management modules, the thermal management modules in the energy storage system are stacked and distributed to form a plurality of thermal management stacks, and the thermal management stacks are symmetrically distributed by using the top air exhaust vent as a center.

25. The energy storage system according to claim 24, further comprising:

a flow diversion apparatus disposed at the top air exhaust vent; and configured to improve a heat dissipation capability of the energy storage system.

26. The energy storage system according to claim 9, further comprising:

a side air exhaust vent, wherein thermal management systems and the plurality of battery packs in the energy storage system are integrated into thermal management modules, the thermal management modules in the energy storage system are stacked and distributed to form a plurality of thermal management stacks, and the thermal management stacks are evenly distributed based on the side air exhaust vent.

27. The energy storage system according to claim 26, further comprising:

a flow diversion apparatus disposed at the side air exhaust vent configured to divert air to flow to the side air exhaust vent, to improve a heat dissipation capability of the energy storage system.

* * * * *